US012582112B1

(12) United States Patent
Bloomquist, Jr. et al.

(10) Patent No.: US 12,582,112 B1
(45) Date of Patent: Mar. 24, 2026

(54) AUTO-ADAPTING PEST DETERRENT SYSTEM USING ARTIFICIAL INTELLIGENCE

(71) Applicant: Ambarella International LP, Santa Clara, CA (US)

(72) Inventors: Robert Dale Bloomquist, Jr., Brighton, MI (US); Udit Budhia, San Jose, CA (US)

(73) Assignee: Ambarella International LP, Santa Clara, CA (US)

( * ) Notice: Subject to any disclaimer, the term of this patent is extended or adjusted under 35 U.S.C. 154(b) by 3 days.

(21) Appl. No.: 18/657,492

(22) Filed: May 7, 2024

(51) Int. Cl.
| | |
|---|---|
| *G08B 13/18* | (2006.01) |
| *A01M 29/10* | (2011.01) |
| *A01M 29/18* | (2011.01) |
| *G06F 40/205* | (2020.01) |

(52) U.S. Cl.
CPC ............ *A01M 29/10* (2013.01); *A01M 29/18* (2013.01); *G06F 40/205* (2020.01)

(58) Field of Classification Search
CPC ...... A01M 29/10; A01M 29/18; G06F 40/205
See application file for complete search history.

(56) References Cited

U.S. PATENT DOCUMENTS

2019/0246623 A1* 8/2019 Tews ................... A01M 31/002
2023/0394255 A1* 12/2023 Ruiter ................... G01K 1/024

FOREIGN PATENT DOCUMENTS

WO WO-2024081801 A1 * 4/2024 ........... G06V 10/143

* cited by examiner

*Primary Examiner* — An T Nguyen
(74) *Attorney, Agent, or Firm* — Maiorana Patent Law, PA

(57) ABSTRACT

An apparatus comprising an interface and a processor. The interface may be configured to receive sensor data from a plurality of sensors. The processor may be configured to detect an intruder in response to an analysis of the sensor data, activate an AI model in response to detecting the intruder and generate a countermeasure signal in response to a countermeasure selection by the AI model. The AI model may be configured to analyze the sensor data, compare the sensor data of the intruder to a database of pests to perform a classification of the intruder, determine the countermeasure selection in response to the classification of the intruder as a selected pest, monitor the sensor data for an outcome of the countermeasure selection, and generate a text description of the classification of the selected pest, the countermeasure selection and the countermeasure outcome.

20 Claims, 11 Drawing Sheets

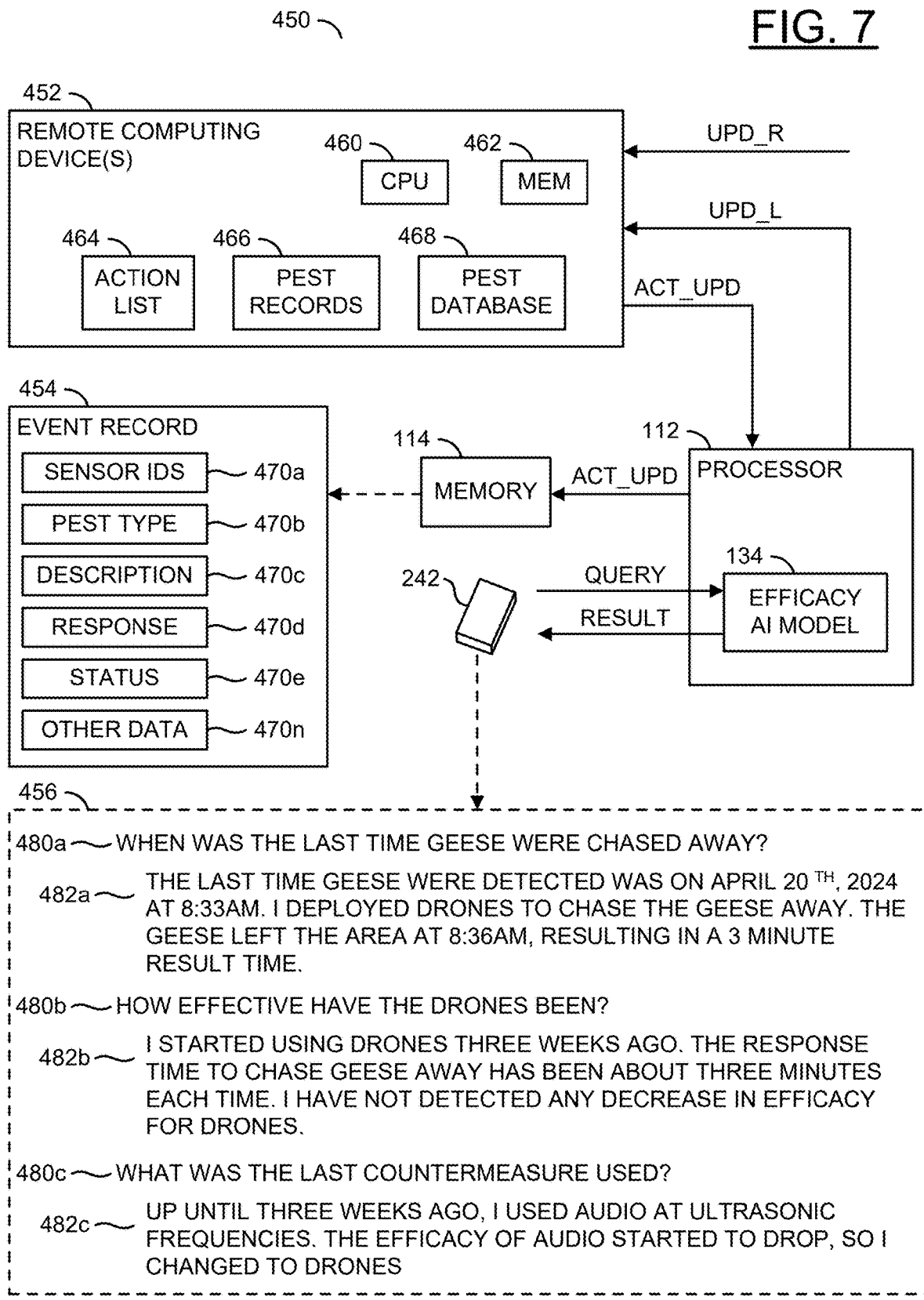

452 ⁀

REMOTE COMPUTING DEVICE(S)

460 ⁀ CPU

462 ⁀ MEM

464 ⁀ ACTION LIST

466 ⁀ PEST RECORDS

468 ⁀ PEST DATABASE

UPD_R

UPD_L

ACT_UPD

454 ⁀

EVENT RECORD

SENSOR IDS ⁀ 470a

PEST TYPE ⁀ 470b

DESCRIPTION ⁀ 470c

RESPONSE ⁀ 470d

STATUS ⁀ 470e

OTHER DATA ⁀ 470n

114 ⁀ MEMORY

ACT_UPD

112 ⁀ PROCESSOR

134 ⁀ EFFICACY AI MODEL

242 ⁀

QUERY

RESULT

456 ⁀

480a ⁀ WHEN WAS THE LAST TIME GEESE WERE CHASED AWAY?

482a ⁀ THE LAST TIME GEESE WERE DETECTED WAS ON APRIL 20 TH, 2024 AT 8:33AM. I DEPLOYED DRONES TO CHASE THE GEESE AWAY. THE GEESE LEFT THE AREA AT 8:36AM, RESULTING IN A 3 MINUTE RESULT TIME.

480b ⁀ HOW EFFECTIVE HAVE THE DRONES BEEN?

482b ⁀ I STARTED USING DRONES THREE WEEKS AGO. THE RESPONSE TIME TO CHASE GEESE AWAY HAS BEEN ABOUT THREE MINUTES EACH TIME. I HAVE NOT DETECTED ANY DECREASE IN EFFICACY FOR DRONES.

480c ⁀ WHAT WAS THE LAST COUNTERMEASURE USED?

482c ⁀ UP UNTIL THREE WEEKS AGO, I USED AUDIO AT ULTRASONIC FREQUENCIES. THE EFFICACY OF AUDIO STARTED TO DROP, SO I CHANGED TO DRONES

600

AUTO-ADAPTING PEST DETERRENT SYSTEM USING ARTIFICIAL INTELLIGENCE

FIELD OF THE INVENTION

The invention relates to location monitoring generally and, more particularly, to a method and/or apparatus for implementing an auto-adapting pest deterrent system using artificial intelligence.

BACKGROUND

Pests can ruin a potentially great experience. From cottages that get swarmed by bugs at particular times of year to decks that get covered in the droppings from various animals, pests are undesirable. Aside from being a nuisance, pests can pose a danger to particular activities, such as birds and airports. Pests can also cause economic harm, such as eating valuable crops.

While it is desirable to remove pests, important considerations should be involved. The harm should not be worse than the cure. Pesticides can harm humans. Objects like scarecrows can be unsightly. Loud noises used to scare birds can be a nuisance. Efforts should also be made not to harm the pests. Simply because a pest is annoying, does not mean that the pest should be killed or harmed. Harming pests can also have unintended consequences (i.e., pesticides meant to protect crops also harm crops by reducing the population of pollinators).

Many animals are capable of adapting to particular deterrents. An owl statue might be effective initially, but pests will eventually not be afraid of the owl statue. Crows are notoriously intelligent and can adapt to a deterrent. If the deterrent methods are not safe or stop deterring the pests, then the deterrent is not effective.

It would be desirable to implement an auto-adapting pest deterrent system using artificial intelligence.

SUMMARY

The invention concerns an apparatus comprising an interface and a processor. The interface may be configured to receive sensor data from a plurality of sensors. The processor may be configured to detect an intruder in response to an analysis of the sensor data, activate an AI model in response to detecting the intruder and generate a countermeasure signal in response to a countermeasure selection by the AI model. The AI model may be configured to analyze the sensor data, compare the sensor data of the intruder to a database of pests to perform a classification of the intruder, determine the countermeasure selection in response to the classification of the intruder as a selected pest, monitor the sensor data for an outcome of the countermeasure selection, and generate a text description of the classification of the selected pest, the countermeasure selection and the countermeasure outcome.

BRIEF DESCRIPTION OF THE FIGURES

Embodiments of the invention will be apparent from the following detailed description and the appended claims and drawings.

FIG. 7 is a block diagram illustrating remote updates for countermeasures and conversational AI for event records.

DETAILED DESCRIPTION OF THE EMBODIMENTS

Figure 1:
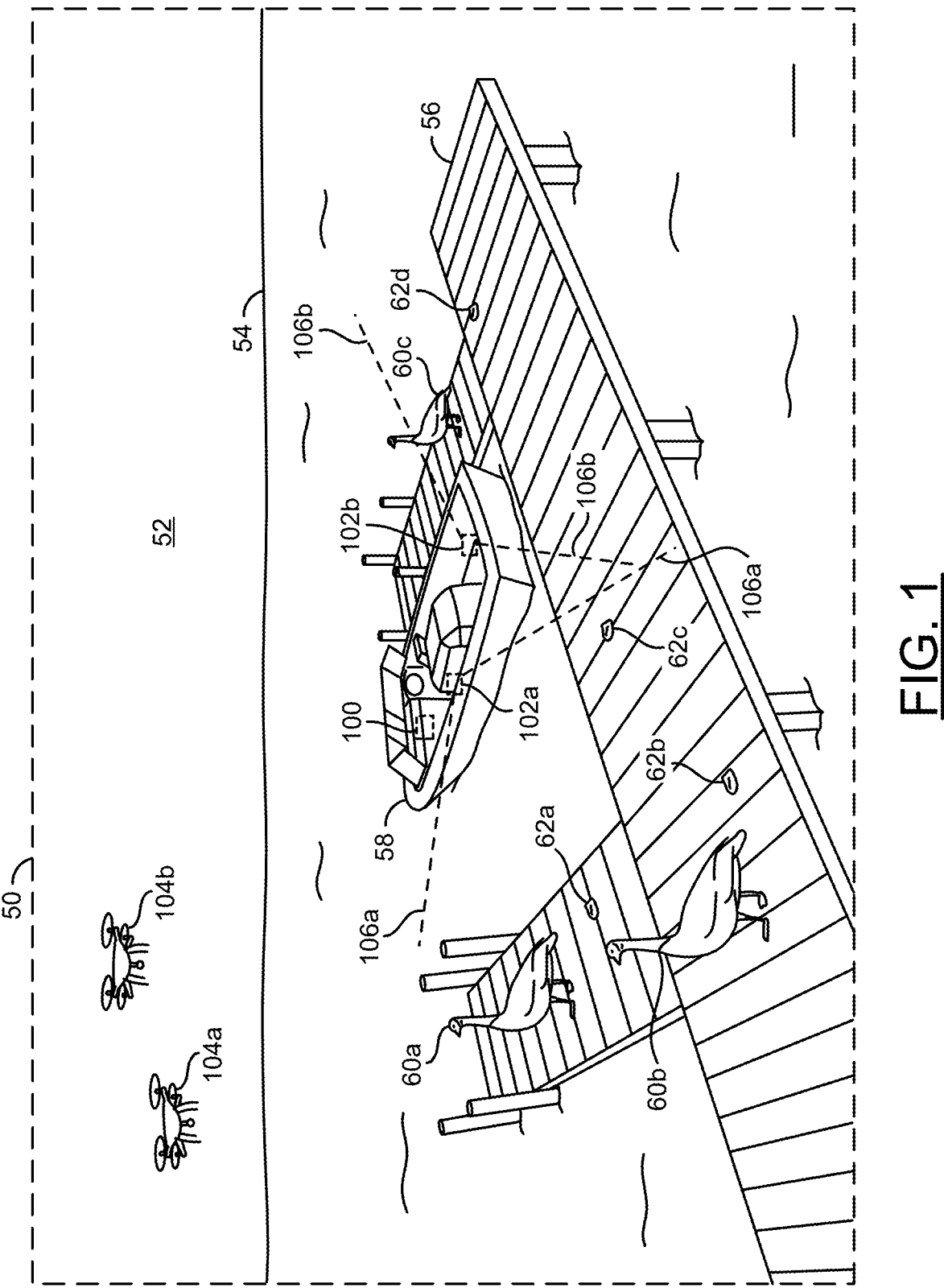
FIG. 1 is a diagram illustrating an example embodiment of the present invention.

Embodiments of the present invention include providing an auto-adapting pest deterrent system using artificial intelligence that may (i) detect a presence of a potential pest, (ii) classify the potential pest against a list of known pests, (iii) deploy a particular deterrent in response to a classified pest, (iv) deploy deterrents that are non-lethal, (v) adapt deterrence methods to particular pests over time through learning, (vi) record events comprising a pest detection, a deterrence method used and an effectiveness of the deterrence method, (vii) analyze a database of deterrence events recorded using artificial intelligence (AI), and/or (viii) be implemented as one or more integrated circuits.

Embodiments of the present invention may be configured to use a combination of sensor inputs and artificial intelligence (AI) models to detect the presence of pests and/or other nuisances and deploy active, non-lethal countermeasures to encourage the pests to leave. Embodiments of the present invention may be implemented in a pre-defined area (e.g., a geo-fenced area). In one example, a detected pest may be geese that enter a water front of a home. In another example, a detected pest may be swarms of bugs in an outdoor region. In yet another example, a detected pest may be a skunk on a property. The types of pests detected may be varied according to the design criteria of a particular implementation.

The sensors implemented may be configured to detect a potential pest. The AI model may be configured to classify the potential pest. For example, a database may be implemented comprising a list of known pests and/or effective countermeasures for particular pests. The AI model may access the database to determine the particular pest detected. If a particular type of pest is detected, then the AI model may select an effective countermeasure to encourage the invader to leave the area. The countermeasures may be non-lethal. The countermeasures may be a series of countermeasures that may escalate over time. The countermeasures may be selected to be as non-intrusive to people as possible. In some embodiments, the deterrents may be contained in fixed devices strategically placed on the property. In some embodiments, the deterrents may be implemented as mobile platforms (e.g., automated air drones, automated ground bots, fixed installation deterrents, etc.) that may be limited to the geo-fenced space. In one example, the deterrent selected may be audio that may be in a frequency that is inaudible to humans. In another example, the deterrent selected may be lights. In yet another example, the deterrent selected may be emitting a smell. In still another example, the deterrent selected may be deploying a device capable of aggressive posturing. The type of deterrent(s) selected may be varied according to the design criteria of a particular implementation.

Embodiments of the present invention may be configured to log (e.g., record) the events detected. Each event record may store the sensor data of the event, the pest classification, the countermeasure deployed and/or an effectiveness of the countermeasure selected. The data for the event records may be provided as input to an AI model (e.g., a Large Language Model (LLM)). The LLM may be configured to generate a natural language text description of the event and the outcome of the event. The natural language text description may comprise a human readable description of the event with sufficient detail to enable a visually impaired person to understand the contents of the event data (e.g., using a screen reader). For example, the sensor data (e.g., video data, lidar data, thermal image data, radar data, etc.) may be converted to readable text.

Embodiments of the present invention may be configured to gather the database the events in the database (e.g., comprising the natural language description of the events) and provide the events as input to an artificial intelligence model (e.g., an LLM) to analyze the events. In some embodiments, the LLM may be the same LLM implemented to generate the natural text description of the events. In some embodiments, the LLM may be a separate AI model from the LLM used to generate the natural text description of the events. The event records may be provided to the LLM continuously (e.g., in real-time) or periodically. The LLM may analyze the events, collect common events, evaluate the effectiveness of the deterrent(s) applied and/or learn about the effectiveness of the deterrent(s) used over time.

Based on the analysis of the aggregation of the events and/or the effectiveness of the deterrents over time, the LLM may learn how the particular pests have adapted to the currently used deterrence methods and manage the recommended deployment of the deterrence methods. In one example, the recommended deployment of the deterrence methods may comprise rotating the deterrent selected (e.g., to avoid continuously re-using a single deterrent method). In another example, the recommended deployment of the deterrence methods may comprise narrowing down options to reach an estimated true deterrence method (e.g., optimize for future engagements). Generally, the recommended deployment may comprise determining how to handle future engagements in similar circumstances such that the efficiency and efficacy of the system improves over time to match the deterrent employed with the pest detected (e.g., learn such that as pests evolve to one approach or the efficacy of an approach declines, the system may evolve as well to continue to be effective over time).

Embodiments of the present invention may be configured to determine whether an intruder is a pest. For example, a desired guest or a "friendly" person (or animal) may be detected. The deterrents may be deployed when the intruder is classified as a pest. In some embodiments, the selection of the particular deterrent deployed may be affected by the presence of a desired guest. For example, particular deterrent methods may not be deployed if people are also present (e.g., a smell may not be deployed when people are in the area, sprinkler systems may not be activated when people are in the area, etc.). In another example, the time of day and/or time of year may affect the selection of a particular deterrence methods (e.g., sprinkler systems would not be used in the winter, lights may be more useful at night, etc.). Generally, the non-lethal deterrents ideally may leverage sounds, light and/or other sensory stimulus on the pests that are out of the human range of human sensory perception (e.g., sound frequencies that animals can hear but are outside of the human hearing range, such that the system does annoy humans in the process of deterring pests).

Embodiments of the present invention may be configured to store the events. The storage and/or observation process may be automated. The event records may define an event as successful and/or unsuccessful. The event records may measure an amount of time taken to encourage pests to leave and/or measure other parameters that may be monitored over time. The efficacy and/or efficiency of the deterrent method may be monitored. The LLM may monitor the event logs over time to learn how efficacy to particular deterrents by particular pests change over time. If the efficacy of a deterrent against a pest degrades over time, the system may automatically adapt and modify the deterrent used in future engagements (e.g., on an as-needed basis). The process may repeat over time to continually adapt and/or evolve.

Referring to FIG. 1, a diagram illustrating an example embodiment of the present invention is shown. An environment 50 is shown. The environment 50 may provide an illustrative example of a dock area. The environment 50 may comprise a sky region 52, a water region 54 and/or a dock 56. A boat 58 may be moored to the dock 56. The environment 50 may be a representative example of an area that may be used by people that may be affected by pests. For example, people may use the dock 56 to access and launch the boat 58 onto the water region 54. In the example shown, no people may be currently present in the environment 50.

A number of intruders 60a-60c are shown in the environment 50. In the example shown, the intruders 60a-60c may be geese. The geese 60a-60c are shown on the dock 56. Geese droppings 62a-62d are shown on the dock 56. The geese droppings 62a-62d may affect the usability of the dock 56. For example, the geese droppings 62a-62d may be unsightly, may be disgusting and/or may potentially spread disease. The geese 60a-60c may be examples of pests. Generally, people may desire to have the geese 60a-60c removed and/or encouraged to avoid landing on the dock 56 (e.g., to prevent the geese droppings 62a-62d).

A block (or circuit) 100, blocks (or circuits) 102a-102b and/or devices (or circuits) 104a-104b are shown. The circuit 100 may implement an apparatus, device and/or system. The circuits 102a-102b may implement sensors. Devices 104a-104b may implement deterrent devices (e.g., countermeasure devices). Lines 106a-106b are shown extending from the sensors 102a-102b, respectively. The lines 106a-106b may represent a detection region/range of the respective sensors 102a-102b. In the example shown, the apparatus 100 and the sensors 102a-102b may be implemented on the boat 58. In the example shown, the deterrent devices 104a-104b are shown flying in the sky region 52. The location and/or implementation of the circuits 100-104b may be varied according to the design criteria of a particular implementation.

The apparatus 100 may be configured to implement an auto-adapting pest deterrent system using artificial intelligence. The apparatus 100 may operate in a pre-defined area. The pre-defined area may be a geo-fenced region. In the example shown, the environment 50 may be an example of a geo-fenced area. The sensors 102a-102b are shown capturing sensor data of the environment 50. Data generated by the sensors 102a-102b (e.g., sensor data) may be presented to the apparatus 100. The apparatus 100 may be configured to detect events in response to an analysis of the sensor data. The events may comprise a detection of a potential intruder.

The apparatus 100 may be configured to perform a classification of events in response to analyzing the sensor data generated by the sensors 106a-106b. The classification may determine whether the potential intruders detected may be false positive events, desired people/animals, pests, etc. In the example shown, the geese 60a-60c may be classified as pests. While the geese 60a-60c are shown as a representative example of intruders and/or pests, the type of intruders and/or pests detected may be varied according to the design criteria of a particular implementation.

The sensors 102a-102b are shown mounted on the boat 58. The sensors 102a-102b may be installed at and/or around the environment 50 to enable the sensor ranges 106a-106b to detect potential intruders and/or an event. In one example, the sensors 102a-102b may be configured to provide raw sensor data to the apparatus 100 and the apparatus 100 may analyze the sensor data to detect potential intruders and/or an event. In another example, the sensors 102a-102b may be configured to detect threshold conditions (e.g., to trip the sensor) and in response to detecting the threshold conditions, the sensors 102a-102b may activate the circuit 100 and/or other sensor systems (e.g., wake from a low power and/or sleep mode of operation). In the example shown, two of the sensors 102a-102b may be implemented to monitor the environment 50. In some embodiments, more or fewer of the sensors 102a-102b may be implemented. The number of the sensors 102a-102b implemented may be varied according to the design criteria of a particular implementation.

In response to classifying the potential intruders of the event as a pest, the apparatus 100 may be configured to deploy the deterrent devices 104a-104b. The deterrent devices 104a-104b may be implemented to attempt to encourage the pests 60a-60c to leave the environment 50. The deterrent devices 104a-104b may be configured to implement one or more non-lethal deterrent actions. In the example shown, the deterrent devices 104a-104b may be drones flying in the sky region 52. For example, the drones 104a-104b may fly close to the geese 60a-60c to chase the geese 60a-60c out of the environment 50. Other deterrent actions may be implemented. For example, the drones 104a-104b may be configured to emit noises to chase the geese 60a-60c away. In another example, the drones 104a-104b may comprise a consumable (e.g., water). For example, the drones 104a-104b may be configured to spray water at the geese 60a-60c. The drones 104a-104b may be further configured to spray the water at the droppings 62a-62d to clean the deck 56 (e.g., the deterrence may allow the pests to stay in the environment 50 but remove a particular type of behavior and/or an undesirable result of a particular behavior such as the droppings 62a-62c). While two of the drones 104a-104b are shown as a representative example of the deterrent devices, other types of deterrent devices and/or more or fewer deterrent devices may be implemented. The number and/or type of deterrent devices implemented may be varied according to the design criteria of a particular implementation.

Figure 2:
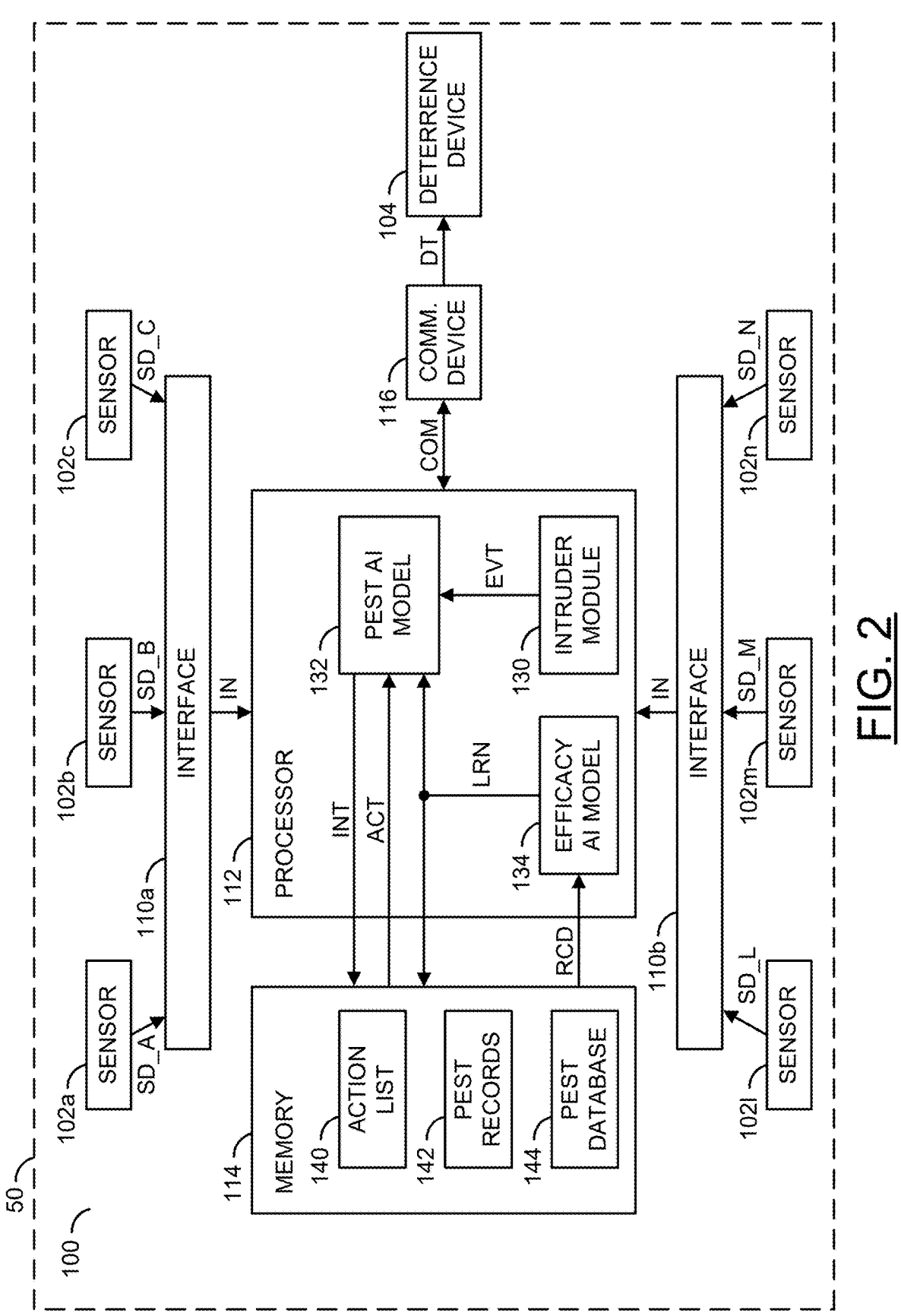
FIG. 2 is a block diagram illustrating an example embodiment of the present invention.

Referring to FIG. 2, a block diagram illustrating an example embodiment of the present invention is shown. The geo-fenced region 50 is shown. A block diagram of the apparatus (or system) 100 is shown implemented in the geo-fenced region 50. For example, the apparatus 100 may be configured to monitor for and deter pests in the geo-fenced region 50.

The apparatus 100 may comprise the sensors 102a-102n, the deterrence device 104, blocks (or circuits) 110a-110b, a block (or circuit) 112, a block (or circuit) 114 and/or a block (or circuit) 116. The circuits 110a-110b may implement an interface. The circuit 112 may implement a processor (or CPU, or APU, or GPU, or AI accelerator, etc.). The circuit 114 may implement a memory. The circuit 116 may implement a communication device. The apparatus 100 may comprise other components (not shown). The number, type and/or arrangement of the components of the apparatus 100 may be varied according to the design criteria of a particular implementation.

The sensors 102a-102n may be configured to capture sensor data of the environment 50. The sensors 102a-102n may be configured to generate a respective signal (e.g., SD_A-SD_N). Each of the signals SD_A-SD_N may comprise the sensor data generated by a respective one of the sensors 102a-102n. The sensors 102a-102n may be configured to communicate the sensor data SD_A-SD_N to the interface 110a-110b. In some embodiments, the sensor data SD_A-SD_N may comprise raw data. In some embodiments, one or more of the sensors 102a-102n may be edge devices capable of performing analysis of the raw sensor data, and the sensor data SD_A-SD_N may comprise an interpretation of the environment 50 by the sensors 102a-102n.

The sensors 102a-102n may comprise various types of sensors and/or may be configured to capture various types of sensor data. In some embodiments, each of the sensors 102a-102n may be one type of sensor (e.g., all cameras). In some embodiments, one or more of the sensors 102a-102n may implement different types of sensors (e.g., one or more cameras, one or more motion detectors, one or more lidar devices, etc.). The sensor data SD_A-SD_N generated by the sensors 102a-102n may provide information about the environment 50 that may be used by the apparatus 100 to detect events, people, animals, intruders, audio, etc. In some embodiments, one of the sensors 102a-102n alone may not be sufficient to detect an event. However, the processor 112 may be configured to implement sensor fusion that may enable inferences to be made based on a combination of data types generated by the sensors 102a-102n.

The sensors 102a-102n may comprise one or more of a camera device, a radar device, a lidar device, a thermal camera device, a time of flight device, etc. In some embodiments, one or more of the sensors 102a-102n may provide a threshold event detector. The threshold event may enable one or more of the sensors 102a-102n to wake up one or more of the components of the apparatus 100. For example, one of the sensors 102a-102n implementing a radar device may be operational while the rest of components of the apparatus 100 are in a low-power standby mode of operation, and the radar device, in response to a detection, may be configured to activate the rest of the sensors 102a-102n and/or one or more components of the apparatus 100. The number of the sensors 102a-102n implemented and/or the types of sensors 102a-102n implemented may be varied according to the design criteria of a particular implementation.

The interface 110a-110b may be configured to receive the sensor data SD_A-SD_N from the sensors 102a-102n. The interface 110a-110b may comprise various inputs/outputs of the apparatus 100. In an example, the interface 110a-110b may comprise pins, wires, connectors, etc. The interface 110a-110b may be configured to generate a signal (e.g., IN). The signal IN may comprise the data received from the sensors 102a-102n. The signal IN may be generated in response to the signals SD_A-SD_N. The signal IN may be presented to the processor 112.

The processor 112 may be configured to receive data, perform operations on the data and/or generate output. The processor 112 may receive input from and/or generate output for the interface 110a-110b, the memory 114 and/or the communication device 116. The processor 112 may be implemented as a central processing device (CPU) and/or an accelerated processing unit (APU). The processor 112 may comprise hardware configured to provide hardware-accelerated artificial intelligence (AI) operations.

The processor 112 may be configured to detect an intruder in response to an analysis of the sensor data received in the signal IN from the interface 110a-110b. In response to the analysis of the sensor data, the processor 112 may determine to activate one or more AI models. For example, the processor 112 may detect a potential intruder based on the sensor data and activate an AI model. The processor 112 may determine a countermeasure (e.g., a deterrence method) in response to the potential intruder. For example, the processor 112 may generate a signal to activate the deterrence device 104.

The processor 112 may be configured to generate a signal (e.g., INT). The processor 112 may be configured to receive the signal IN, a signal (e.g., ACT) and/or a signal (e.g., RCD). The processor 112 may be configured to communicate a signal (e.g., COM). The signal INT may comprise an intruder detection. The signal INT may be communicated to the memory 114. The signal ACT may comprise an action selection. The signal ACT may be received from the memory 114. The signal RCD may comprise a record data signal. The signal RCD may be received from the memory 114. The signal COM may comprise communication data. The signal COM may be communicated to and/or received from the communication device 116. The number, type and/or data communicated by the signals generated by and/or received by the processor 112 may be varied according to the design criteria of a particular implementation.

The memory 114 may be configured to store data. In some embodiments, the memory 114 may be a local memory implemented by the apparatus 100. For example, the memory 114 may comprise a cache for the processor 112, a RAM for the processor 112, a storage device (e.g., hard disk drive, solid state drive, flash drive, etc.) for the apparatus 100, etc. In some embodiments, the memory 114 may be remote storage accessed by the apparatus 100. For example, the memory 114 may be remote storage device, a cloud storage/computing system, etc. In an example, the memory 114 may not necessarily be located in the environment 50 with the apparatus 100. The type of the memory 114 implemented may be varied according to the design criteria of a particular implementation.

The memory 114 may be implemented as part of a scalable computing service configured to store data, retrieve and transmit stored data, process data and/or communicate with other devices. The scalable computing service implementing the memory 114 may be implemented as part of a cloud computing platform (e.g., distributed computing). In an example, the scalable computing service implementing the memory 114 may be implemented as a group of cloud-based, scalable server computers. By implementing a number of scalable servers, additional resources (e.g., power, processing capability, memory, etc.) may be available to process and/or store variable amounts of data. For example, the scalable computing service implementing the memory 114 may be configured to scale (e.g., provision resources) based on demand. The scalable computing services implementing the memory 114 may implement scalable computing (e.g., cloud computing). The scalable computing may be available as a service to allow access to processing and/or storage resources without having to build infrastructure (e.g., the provider of the apparatus 100 may not have to build the infrastructure of the scalable computing service).

The memory 114 may be configured to receive the signal INT from the processor 112. The memory 114 may be configured to generate the signal ACT. The memory 114 may be configured to store information about various pests and/or particular deterrence actions available for the processor 112. The memory 114 may be configured to generate the signal RCD. The memory 114 may be configured to store event records generated by the processor 112.

The communication device 116 may be configured to facilitate communication between the processor 112, one or more of the deterrence devices 104 and/or other networks. The communication device 116 may implement a wired communication interface and/or a wireless communication interface. In some embodiments, the communication device 116 may be part of the interface 110a-110b. The type and/or protocol of communication implemented by the communication device 116 may be varied according to the design criteria of a particular implementation.

The communication device 116 may be configured to receive and/or generate the signal COM. The signal COM may comprise data communicated by the processor 112 for the deterrence device 104 and/or to other devices/networks. The signal COM may comprise data communicated to the processor 112 from the deterrence device 104 and/or other devices/networks. The communication device 116 may be configured to generate a signal (e.g., DT). The signal DT may be a countermeasure signal. The signal DT may be communicated to the deterrence device 104. The countermeasure signal DT may enable the deterrence device 104 and/or provide instructions to the deterrence device 104 to enable one or more available countermeasures implemented by the deterrence device 104.

The deterrence device 104 may be configured to perform the countermeasure selected by the processor 112. The deterrence device 104 may be configured to receive the signal DT. In some embodiments, the deterrence device 104 may be configured to activate/deactivate in response to the signal DT. For example, the deterrence device 104 may have a single function that may be turned on/off by the processor 112. In some embodiments, the deterrence device 104 may be configured to execute computer readable instructions provided in the signal DT. The computer readable instructions may be generated by the processor 112 to enable the deterrence device 104 to perform particular actions to deter the pests.

The deterrence device 104 may comprise one or more of drones, bots and/or fixed location devices. In an example, aerial drones may be configured to fly in the sky region 52 and/or maneuver to chase away the pests 60a-60c and/or deploy countermeasures (e.g., spray water/chemicals, emit a scent, flash lights, etc.). Similarly, bots may comprise autonomous, ground-based devices that may be configured to chase away the pests 60a-60c and/or deploy countermeasures (e.g., spray water/chemicals, emit a scent, flash lights, etc.). In an example, the bots may operate similar to a robotic vacuum cleaner and/or robotic lawnmower but be equipped with countermeasures. In some embodiments, the fixed location devices may be installed throughout the environment 50. For example, fixed location devices may comprise lights, speakers, fans, sprinkler systems, etc. The countermeasures may comprise a combination of lights, audio, chemicals, airflow, aggressive posturing, etc. Generally, the countermeasures implemented may be selected to be harmless and/or unnoticeable (or at least tolerable) to people. The countermeasures implemented by the deterrence device 104 may be non-lethal. For example, the deterrence device 104 may be implemented to remove the pests 60a-60c from the environment 50, but not kill or otherwise cause harm to the pests 60a-60c.

The processor 112 may comprise a block (or circuit) 130, a block (or circuit) 132 and/or a block (or circuit) 134. The circuit 130 may implement an intruder module. The circuit 132 may implement a pest AI model. The circuit 134 may implement an efficacy AI model. The processor 112 may comprise other components (not shown). The number, type and/or arrangement of the components of the processor 112 may be varied according to the design criteria of a particular implementation.

The intruder module 130 may be configured to detect an intruder in response to an analysis of the sensor data from the signal IN. The intruder module 130 may be configured to implement an initial threshold detection. For example, the intruder module 130 may provide sufficient analysis to detect that an event has occurred but may not necessarily perform a classification of the event. For example, the intruder module 130 may provide sufficient analysis for detecting the presence of a potential intruder but may not necessarily determine whether the intruder is a person, an animal, a welcomed guest, a pest, etc. In one example, the threshold detection may comprise detecting a pre-determined amount of motion based on analysis of radar data. In another example, the threshold detection may comprise detecting particular types of objects based on performing computer vision operations. In yet another example, the threshold detection may comprise detecting particular temperature ranges in response to a temperature sensor and/or a thermal image. The type of initial threshold detection implemented may be varied according to the design criteria of a particular implementation.

The intruder module 130 may be configured to generate a signal (e.g., EVT). The signal EVT may be an event signal. The intruder module 130 may generate the signal EVT in response to an analysis of the sensor data that indicates an event has been detected (e.g., sensor data that crosses the initial threshold detection). The intruder module 130 may be configured to activate one or more AI models implemented by the processor 112. In an example, the signal EVT may be presented to the pest AI model 132. For example, the pest AI model 132 and/or the efficacy AI model 134 may operate in a low power, sleep (or standby) mode when not active. Operating in the low power mode may conserve computational resources and/or power consumption. The signal EVT may activate the pest AI model 132 to enable an analysis of the event detected by the intruder module 130.

The pest AI model 132 and/or the efficacy AI model 134 may each implement a Large Language Model (LLM). In some embodiments, the processor 112 may implement a single AI module configured to operate the functions of the pest AI model 132 and the efficacy AI model 134. In some embodiments, the processor 112 may implement separate AI modules each configured to implement one of the pest AI model 132 and the efficacy AI model 134.

The pest AI model 132 may be configured to generate the signal INT and receive the signal ACT and/or a signal (e.g., LRN). The signal INT may comprise a record of the event detected, the analysis of the event detected and/or the countermeasure selected in response to the event. The signal ACT may comprise information about known pests and/or available countermeasures that may be effective to deter the known pests. The signal LRN may comprise information about ongoing efficacy of particular deterrent methods for particular pests that may be used to update weights and/or biases that may define the pest AI model 132.

The pest AI model 132 may be configured to perform a classification of the event. The pest AI model 132 may be configured to analyze the sensor data received in the signal IN and/or the signal EVT. For example, the intruder module 130 may be configured to extract from all of the available sensor data, the particular sensor data that may be relevant to the event detected by the intruder module 130 (e.g., extract data based on timestamps that correspond to the detection of the event/intruder). The pest AI model 132 may be configured to compare the sensor data in the signal EVT to a database of pests implemented by the memory 114. For example, the pest AI model 132 may receive the signal ACT comprising information about various pests and/or available countermeasures for the pests. Based on the comparison, the pest AI model 132 may be configured to perform a classification of the intruder. For example, the classification may determine whether the intruder is a pest at all and/or determine the particular pest detected. If the intruder is determined not to be a pest by the pest AI model 132, then the processor 112 may perform no action/countermeasure (e.g., the pest AI model 132 may return to a sleep/standby state). If the intruder is determined to be a pest by the pest AI model 132, then the pest AI model 132 may determine which actions/countermeasures to perform to remove the pests 60a-60c from the environment 50.

The pest AI model 132 may be configured to determine a selection of a countermeasure in response to the classification of the intruder as a pest (e.g., the selected pest). The pest AI model 132 may receive the signal ACT comprising the list of available countermeasures and/or data about methods of deterrence for the selected pest. The pest AI model 132 may comprises a number of adjustable weights and/or biases that may be used to determine the appropriate countermeasure and/or a countermeasure most likely to be effective based on the context of the environment 50 (e.g., time of day, number of people around, weather conditions, time of year, amount of noise, local knowledge based on past events specific to the environment 50, etc.) and/or the particular pests classification. The processor 112 may generate the signal COM and/or enable the signal DT to activate and/or deploy the deterrence device 104 based on a selected countermeasure determined by the pest AI model 132.

The pest AI model 132 may continue to receive the sensor data generated by the sensors 102a-102n while the deterrence device 104 is deployed and/or after the deterrence device 104 has finished performing the selected countermeasure. The pest AI model 132 may analyze the environment 50 in order to monitor for an outcome of the selected countermeasure. For example, the pest AI model 132 may determine whether the countermeasure has resulted in the pests 60a-60c leaving the geo-fenced region 50, an amount of time taken to cause the pests 60a-60c to leave the geo-fenced region 50, whether some, all or none of the pests 60a-60c have left the geo-fenced region 50, whether the pests 60a-60c have returned to the geo-fenced region 50 after leaving, an amount of disturbance caused to people in the geo-fenced region 50, whether the pests 60a-60c have been harmed, etc. Based on the outcome determined, the pest AI model 132 may generate an event record.

The event record may comprise a text description of the classification determined, a reason for the classification of a particular pest, a countermeasure selected for the selected pest, a basis for the selection of the countermeasure, a description of the environment 50 and/or an outcome of the countermeasure. The signal INT may comprise the event record. The event record may be stored in the memory 114. For example, one event record may be generated for each event detected by the intruder module 130. The text description of the event record may comprise a natural text (e.g., human readable) description. The particular details generated for the event records may be varied according to the design criteria of a particular implementation.

The efficacy AI model 134 may be configured to retrieve the event records from the memory 114. The efficacy AI model 134 may be configured to request multiple event records from the memory 114. In one example, the efficacy AI model 134 may periodically request event records of a particular type (e.g., based on the pest, based on a success/failure outcome, based on a time of day/year, based on the countermeasure selected, etc.). In another example, the efficacy AI model 134 may request event records after each event record has been stored in the memory 114. The efficacy AI model 134 may be configured to analyze multiple of the event records (e.g., pest events) stored in a database. The analysis may be configured to determine whether there is a decrease in efficacy of the countermeasure selection for a particular pest. The pests 60a-60c may, over time, learn and/or adapt to one or more countermeasures. For example, the pests 60a-60c may initially be scared away by a loud sound, but may eventually get used to the sound and no longer react, resulting in the sound countermeasure becoming ineffective. In another example, a countermeasure may be effective for large amounts of the pests but result in more disturbance to people in the environment 50, and at different times when there are fewer of the pests, a less intrusive countermeasure may be equally effective without disturbing the people (e.g., efficacy may be determined according to the reactions of the pests as well as an amount of disruption caused by the countermeasure).

The efficacy AI model 134 may be configured to determine changes in efficacy of particular countermeasures for particular pests and/or environmental contexts. The efficacy AI model 134 may be configured to determine errors in the classification of the pests made by the pest AI model 132. In one example, the efficacy AI model 134 may determine a classification error (e.g., out of three goose events detected, one was actually a skunk). In another example, the efficacy AI model 134 may determine a narrower classification (e.g., out of three goose events detected, one goose was a particular breed of geese that may have different behaviors). The efficacy AI model 134 may be configured to adapt to a decrease in efficacy and/or effectiveness of countermeasures to the pests by modifying the countermeasure selection. In one example, the efficacy AI model 134 may alter a countermeasure to attempt to improve efficacy (e.g., use a similar countermeasure with adjustments). For example, an initial countermeasure may be a sound generated with one frequency and/or sound signature and may be adjusted to be a sound generated with a different frequency and/or sound signature. In another example, the efficacy AI model 134 may alter a countermeasure by selecting another type of countermeasure. For example, an initial countermeasure may be the sound generated, and an adjustment may be deploying one of the drones 104a-104b.

The efficacy AI model 134 may determine updated parameters for the pest AI model 132. In an example, the updated parameters for the pest AI model 132 may be adjusted weights and/or biases. The weights and/or biases may be used by the pest AI model 132 to determine which of the countermeasures to select and/or the classification of the pests. The updated parameters generated by the efficacy AI model 134 may enable the pest AI model 132 to evolve over time. The efficacy AI model 134 may generate the signal LRN comprising the updated parameters. The types of adjustments made by the efficacy AI model 134 may be varied according to the design criteria of a particular implementation.

The weights and/or biases implemented by the pest AI model 132 may be updated in response to receiving the signal LRN. The pest AI model 132 may be configured to be activated in response to an event detected, by the intruder module 130, determine whether the event corresponds to a pest, classify the pests, determine which countermeasure to deploy, and generate an event record. The pest AI model 132 may learn and/or adapt in response to the signal LRN. The pest AI model 132 may continually react to events, and receive updates from the efficacy AI model 134 based on the event records generated.

In some embodiments, the pest AI model 132 may be configured to implement video-to-text analysis (or other sensor data to text analysis). The video-to-text analysis may generate a plain text (e.g., natural language that may be human readable) description of the content of the video frames generated by the sensors 102a-102n. For example, the pest AI model 132 may simultaneously analyze the video data and/or sensor data to create the text, and also continuously evaluate the potential intruders detected using the text as the text is created (e.g., in real-time). In some embodiments, the pest AI model 132 may implement multiple AI models. For example, a video-to-text AI model may be configured to perform computer vision operations that generates the text description of what has happened and/or what has been detected in the video data, while a lidar-to-text AI model also generates a text description of the lidar data. The pest AI model 132 may comprise a classifier configured to determine which types of pests have been detected and/or whether an intruder is a pest or not. Analyzing the text instead of the video data for the intruder classification and/or countermeasure selection may provide a less computationally intensive analysis than generating text and then re-analyzing the video data to detect objects. In an example, the pest AI model 132 may be configured to perform sensor fusion operations to combine and/or generate inferences from the various types of sensor data generated (e.g., combining video data and other sensor data such as radar data and thermal images).

The pest AI model 132 may be configured to generate the event records by performing natural language processing and generate natural language text based on learned patterns and/or relationships between words in a particular spoken/written human language. The event records may comprise a full text description of the video frames, the sensor data and/or inferences determined in response to a combination of the video frames and the sensor data. The event records may comprise a plain language description of the objects in the video frames, the context of the video frames, the colors in the video frames, the arrangement of the visual elements in the video frames, the behavior of objects in the video frames, the location of objects in the video frames, the types of objects in the video frames, etc. The event records may comprise a plain language description of the sensor readings and/or information determined in response to the sensor readings. For example, a sensor reading may comprise a temperature and movement information in response to multiple sensor readings and describe that a living creature has been detected.

The event records may be determined based on not only a current video frame and sensor data, but also previous video frames and sensor data, and later video frames and sensor data. For example, a single video frame of an object (e.g., bird) in the air may not provide sufficient information to determine a location and/or behavior of the object. Analyzing the previous and later video frames may provide context to enable the pest AI model 132 to determine behavior such as whether the object in the air is flying into the geo-fenced region 50 or flying out of the geo-fenced region 50. In some embodiments, the event records may provide an initial description (e.g., a best guess) based on the content of the current and previous video frames to provide real-time analysis, and then update the event records as subsequent video frames are analyzed to update the initial description after more context becomes available (e.g., the initial description may describe an object as flying east, but after subsequent video frames are analyzed, the object may be determined to be flying west). The pest AI model 132 may be configured to determine behaviors of objects in the video frames analyzed. For example, the behavior may comprise a classification of movements of objects and/or a location of the objects in response to various objects, behaviors and/or patterns detected. The method of describing the contents of the video data may be varied according to the design criteria of a particular implementation.

In one example, the pest AI model 132 may implement a video-to-text AI model. In one example, the AI model implementing the video-to-text analysis may be a transformer network. In another example, the AI model implementing the video-to-text analysis may be performed using a convolutional neural network. Generally, the AI model implementing the video-to-text analysis may be a type of neural network. In one example, the AI model implementing the video-to-text analysis may provide bootstrapping language-image pre-training with frozen image encoders and large language models (e.g., BLIP-2). The AI model may be implemented based on a generic and efficient pre-training strategy that bootstraps vision-language pre-training from off-the-shelf, frozen, pre-trained image encoders and frozen large language models. The AI model may comprise a querying transformer pre-trained with a first stage that bootstraps vision-language representation learning from a frozen image encoder and a second stage that bootstraps vision-to-language generative learning from a frozen language model. In another example, the AI model may be implemented based on a Flamingo80B model. The AI model implemented by the pest AI model 132 may be configured with emerging capabilities of zero-shot image-to-text generation that may follow natural language instructions. Details of the pest AI model 132 and/or the efficacy AI model 134 may be described in U.S. patent application Ser. No. 18/210,931, filed on Jun. 16, 2023, appropriate portions of which are incorporated by reference. The type of AI model implemented for sensor data to text may be varied according to the design criteria of a particular implementation.

The memory 114 may comprise a block (or circuit) 140, a block (or circuit) 142 and/or a block (or circuit) 144. The block 140 may implement storage of an action list. The block 142 may implement storage of event records. The block 144 may implement storage of a pest database. The memory 114 may comprise other components and/or data storage (not shown). The type of data stored and/or the arrangement of data stored by the memory 114 may be varied according to the design criteria of a particular implementation.

The action list 140 may comprise a list of deterrent options. The deterrent options may be used by the pest AI model 132 to determine which of the countermeasures to select. The deterrents in the action list 140 may be a list of options, which may be chosen based on a pest type and prior efficacy. The deterrent options in the action list 140 may be listed based on the available deterrent devices 104 implemented by the apparatus 100. The action list 140 may comprise deterrent options and/or information about which deterrent options may be effective against particular pests. Data from the action list 140 may be presented to the pest AI model 132 via the signal ACT. The action list 140 may be updated by the efficacy AI model 134 via the signal LRN. In some embodiments, the action list 140 may be updated in response to data from remote sources.

The pest records 142 may comprise the event records. The event records may comprise the natural text description generated by the pest AI model 132. The pest records 142 may provide a database of the event records. The database implemented by the pest records 142 may enable the event records to be sorted, searched, updated, classified, etc. The pest records 142 may be searched by the efficacy AI model 134. For example, the database implemented by the pest records 142 may enable the efficacy AI model 134 to request multiple event records with various commonalities (e.g., request all event records from a particular time range, request all event records with particular keywords, request all event records comprising a particular pest, request all event records where a particular countermeasure was implemented, request all event records that resulted in a failure to deter the pests, etc.). The event records may be provided to the efficacy AI model 134 via the signal RCD.

The pest database 144 may comprise information about the pests. The pest database 144 may comprise a text description of the pests. Information from the pest database may be communicated to the pest AI model 132 via the signal ACT. The pest AI model 132 may be configured to compare the text description generated for the event to the text description of the pests to classify the pests detected. The pest database 144 may further comprise images of various pests, sounds made by pests, size and shape information, behavioral information, known responses to particular countermeasures, etc. For example, the pest AI model 132 may be further configured to perform audio and/or video/image analysis to classify the pests detected. In some embodiments, the number of pests in the pest database 144 may be limited based on a particular region that the apparatus 100 is implemented (e.g., non-native species may be excluded). Data in the pest database 144 may be updated based on analysis by the efficacy AI model 134 via the signal LRN. In some embodiments, the pest database 144 may be updated in response to data from remote sources.

Figure 3:
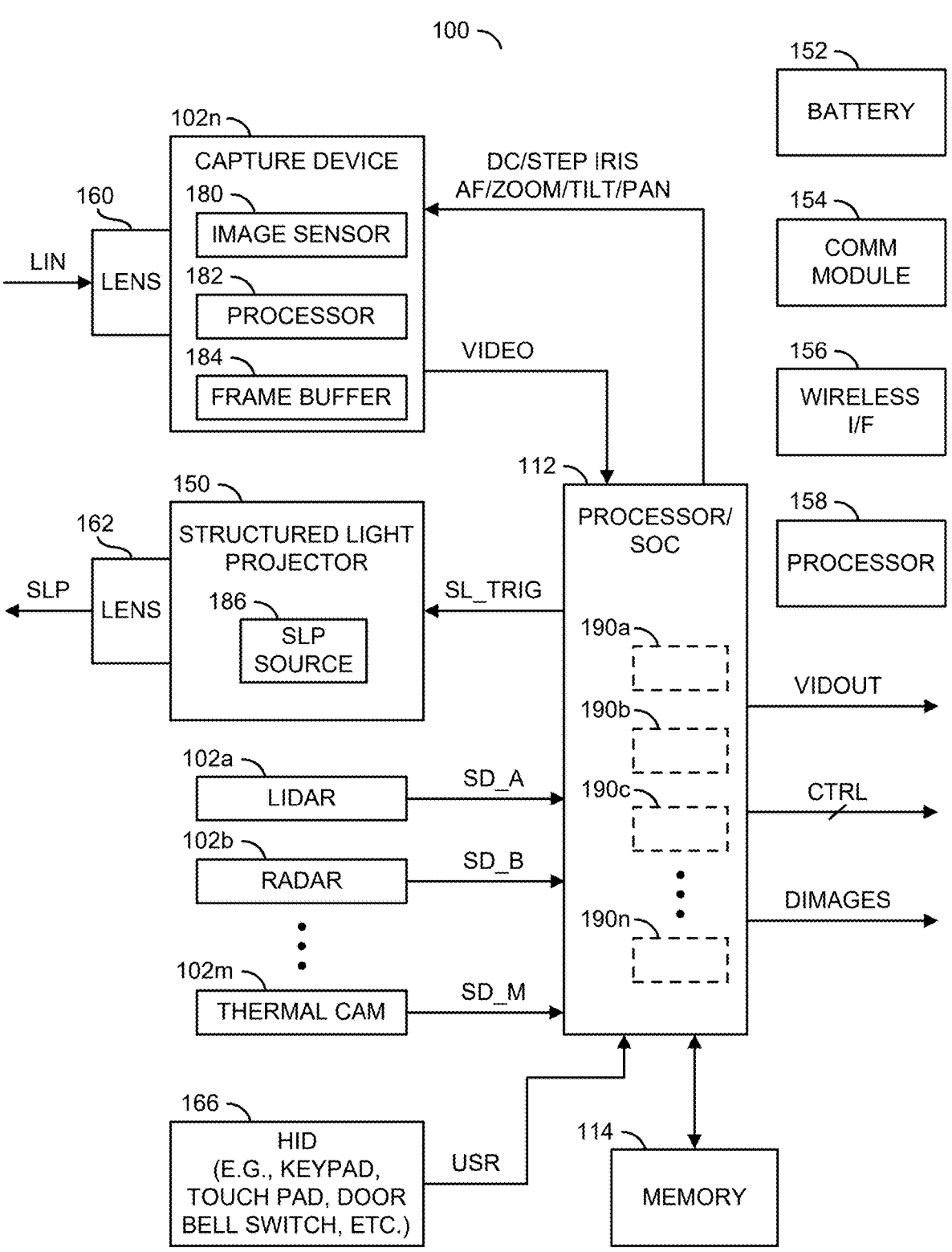
FIG. 3 is a block diagram illustrating a camera system configured to detect pests.

Referring to FIG. 3, a block diagram illustrating a camera system configured to detect pests is shown. An example implementation of the apparatus 100 is shown. The apparatus 100 may be a representative example of the apparatus 100 shown in association with FIG. 2. In the example shown, one of the sensors 102a-102n (e.g., the sensor 102n) may implement a video capture device (e.g., a video camera). The apparatus 100 may comprise sensors 102a-102n, the processor 112, and the memory 114 as described in association with FIG. 2. The circuit 102n may implement a capture device. The apparatus 100 may further comprise a block (or circuit) 150. The circuit 150 may implement a structured light projector.

The processor 112 may be configured to implement an artificial neural network (ANN). In an example, the ANN may comprise a convolutional neural network (CNN). The processor 112 may be configured to implement a large language model (LLM). The processor 112 may be configured to implement a video encoder. The processor 112 may be configured to process the pixel data arranged as video frames. The capture device 102n may be configured to capture pixel data that may be used by the processor 112 to generate video frames. The structured light projector 150 may be configured to generate a structured light pattern (e.g., a speckle pattern). The structured light pattern may be projected onto a background (e.g., the environment 50). The capture device 102n may capture the pixel data comprising a background image (e.g., the environment 50) with the speckle pattern.

The apparatus 100 may be an edge device. The processor 112 implemented by the apparatus 100 may enable the apparatus 100 to implement various functionality internally (e.g., at a local level). For example, the processor 112 may be configured to perform object/event detection (e.g., computer vision operations), 3D reconstruction, liveness detection, depth map generation, video encoding and/or video transcoding on-device. For example, even advanced processes such as computer vision and 3D reconstruction may be performed by the processor 112 without uploading video data to a cloud service in order to offload computation-heavy functions (e.g., computer vision, video encoding, video transcoding, etc.). In some embodiments, calculations and/or other operations to initialize and/or generate results for an AI model may be performed locally by the processor 112.

In some embodiments, multiple cameras may be implemented (e.g., more than one of the sensors 102a-102n may implement a camera that may operate independently from each other). For example, each of the cameras may individually analyze the pixel data captured and perform the event/object detection locally. In some embodiments, the cameras may be configured as a network of cameras (e.g., security cameras that send video data to a central source such as network-attached storage and/or a cloud service). The locations and/or configurations of the cameras in the environment 50 may be varied according to the design criteria of a particular implementation.

The capture device 102n may comprise a single lens (e.g., a monocular camera). The processor 112 may be configured to accelerate preprocessing of the speckle structured light for monocular 3D reconstruction. Monocular 3D reconstruction may be performed to generate depth images and/or disparity images without the use of stereo cameras.

The apparatus 100 may further comprise a block (or circuit) 152, a block (or circuit) 154, a block (or circuit) 156, a block (or circuit) 158, a block (or circuit) 160, a block (or circuit) 162, and/or a block (or circuit) 166. The circuit 152 may implement a battery. The circuit 154 may implement a communication device. The circuit 156 may implement a wireless interface. The circuit 158 may implement a general purpose processor. The block 160 may implement an optical lens. The block 162 may implement a structured light pattern lens. The circuit 166 may implement a human interface device (HID). In some embodiments, the apparatus 100 may comprise the processor/SoC 112, the capture device 102n, the IR structured light projector 150, the memory 114, the lens 160, the IR structured light projector 150, the structured light pattern lens 162, the sensors 102a-102n, the battery 152, the communication module 154, the wireless interface 156 and the processor 158. In another example, the apparatus 100 may comprise processor/SoC 112, the capture device 102n, the structured light projector 150, the processor 158, the lens 160, the structured light pattern lens 162, and the sensors 102a-102n as one device, and the memory 114, the battery 152, the communication module 154, and the wireless interface 156 may be components of a separate device. The apparatus 100 may comprise other components (not shown). The number, type and/or arrangement of the components of the apparatus 100 may be varied according to the design criteria of a particular implementation.

In some embodiments, the processor 112 may be implemented as a video processor. In an example, the processor 112 may be configured to receive triple-sensor video input with high-speed SLVS/MIPI-CSI/LVCMOS interfaces. In some embodiments, the processor 112 may be configured to perform depth sensing in addition to generating video frames. In an example, the depth sensing may be performed in response to depth information and/or vector light data captured in the video frames. In some embodiments, the processor 112 may be implemented as a dataflow vector processor. In an example, the processor 112 may comprise a highly parallel architecture configured to perform image/video processing and/or radar signal processing.

The memory 114 may store data. The memory 114 may implement various types of memory including, but not limited to, a cache, flash memory, memory card, random access memory (RAM), dynamic RAM (DRAM), etc. The type and/or size of the memory 114 may be varied according to the design criteria of a particular implementation. The data stored in the memory 114 may correspond to a video file, motion information (e.g., readings from the sensors 102a-102n), video fusion parameters, image stabilization parameters, user inputs, computer vision models, feature sets, radar data cubes, radar detections and/or metadata information. In some embodiments, the memory 114 may store reference images. The reference images may be used for computer vision operations, 3D reconstruction, auto-exposure, etc. In some embodiments, the reference images may comprise reference structured light images.

The processor/SoC 112 may be configured to execute computer readable code and/or process information. In various embodiments, the computer readable code may be stored within the processor/SoC 112 (e.g., microcode, etc.) and/or in the memory 114. In an example, the processor/SoC 112 may be configured to execute one or more artificial neural network models (e.g., facial recognition CNN, object detection CNN, object classification CNN, 3D reconstruction CNN, liveness detection CNN, etc.) stored in the memory 114. In an example, the memory 114 may store one or more directed acyclic graphs (DAGs) and one or more sets of weights and biases defining the one or more artificial neural network models. In yet another example, the memory 114 may store instructions to perform transformational operations (e.g., Discrete Cosine Transform, Discrete Fourier Transform, Fast Fourier Transform, etc.). The processor/SoC 112 may be configured to receive input from and/or present output to the memory 114. The processor/SoC 112 may be configured to present and/or receive other signals (not shown). The number and/or types of inputs and/or outputs of the processor/SoC 112 may be varied according to the design criteria of a particular implementation. The processor/SoC 112 may be configured for low power (e.g., battery) operation.

The battery 152 may be configured to store and/or supply power for the components of the apparatus 100. The dynamic driver mechanism for a rolling shutter sensor may be configured to conserve power consumption. Reducing the power consumption may enable the apparatus 100 to operate using the battery 152 for extended periods of time without recharging. The battery 152 may be rechargeable. The battery 152 may be built-in (e.g., non-replaceable) or replaceable. The battery 152 may have an input for connection to an external power source (e.g., for charging). In some embodiments, the apparatus 100 may be powered by an external power supply (e.g., the battery 152 may not be implemented or may be implemented as a back-up power supply). The battery 152 may be implemented using various battery technologies and/or chemistries. The type of the battery 152 implemented may be varied according to the design criteria of a particular implementation.

The communications module 154 may be configured to implement one or more communications protocols. For example, the communications module 154 and the wireless interface 156 may be configured to implement one or more of, IEEE 102.11, IEEE 102.15, IEEE 102.15.1, IEEE 102.15.2, IEEE 102.15.3, IEEE 102.15.4, IEEE 102.15.5, IEEE 102.20, Bluetooth®, and/or ZigBee®. In some embodiments, the communication module 154 may be a hard-wired data port (e.g., a USB port, a mini-USB port, a USB-C connector, HDMI port, an Ethernet port, a Display-Port interface, a Lightning port, etc.). In some embodiments, the wireless interface 156 may also implement one or more protocols (e.g., GSM, CDMA, GPRS, UMTS, CDMA2000, 3GPP LTE, 4G/HSPA/WiMAX, SMS, etc.) associated with cellular communication networks. In embodiments where the camera 102n is implemented as a wireless camera, the protocol implemented by the communications module 154 and wireless interface 156 may be a wireless communications protocol. The type of communications protocols implemented by the communications module 154 may be varied according to the design criteria of a particular implementation.

The communications module 154 and/or the wireless interface 156 may be configured to generate a broadcast signal as an output from the apparatus 100. In some embodiments, the communication module 154 and/or the wireless interface 156 may implement the communication device 116. The broadcast signal may send video data, disparity data and/or a control signal(s) to external devices. For example, the broadcast signal may be sent to a cloud storage service (e.g., a storage service capable of scaling on demand). In some embodiments, the communications module 154 may not transmit data until the processor/SoC 112 has performed video analytics and/or radar signal processing to determine that an object is in the field of view of the apparatus 100.

In some embodiments, the communications module 154 may be configured to generate a manual control signal. The manual control signal may be generated in response to a signal from a user received by the communications module 154. The manual control signal may be configured to activate the processor/SoC 112. The processor/SoC 112 may be activated in response to the manual control signal regardless of the power state of the apparatus 100.

In some embodiments, the communications module 154 and/or the wireless interface 156 may be configured to receive a feature set. The feature set received may be used to detect events and/or objects. For example, the feature set may be used to perform the computer vision operations. The feature set information may comprise instructions for the processor 112 for determining which types of objects correspond to an object and/or event of interest.

In some embodiments, the communications module 154 and/or the wireless interface 156 may be configured to receive user input. The user input may enable a user to adjust operating parameters for various features implemented by the processor 112. In some embodiments, the communications module 154 and/or the wireless interface 156 may be configured to interface (e.g., using an application programming interface (API) with an application (e.g., an app). For example, the app may be implemented on a smartphone to enable an end user to adjust various settings and/or parameters for the various features implemented by the processor 112 (e.g., set video resolution, select frame rate, select output format, set tolerance parameters for 3D reconstruction, etc.).

The processor 158 may be implemented using a general purpose processor circuit. The processor 158 may be operational to interact with the video processing circuit 112 and the memory 114 to perform various processing tasks. The processor 158 may be configured to execute computer readable instructions. In one example, the computer readable instructions may be stored by the memory 114. In some embodiments, the computer readable instructions may comprise controller operations. Generally, input from the sensors 102a-102n and/or the human interface device 166 are shown being received by the processor 112. In some embodiments, the general purpose processor 158 may be configured to receive and/or analyze data from the sensors 102a-102n and/or the HID 166 and make decisions in response to the input. In some embodiments, the processor 158 may send data to and/or receive data from other components of the apparatus 100 (e.g., the battery 152, the communication module 154 and/or the wireless interface 156). Which of the functionality of the apparatus 100 is performed by the processor 112 and the general purpose processor 158 may be varied according to the design criteria of a particular implementation.

The lens 160 may be attached to the capture device 102n. The capture device 102n may be configured to receive an input signal (e.g., LIN) via the lens 160. The signal LIN may be a light input (e.g., an analog image). The lens 160 may be implemented as an optical lens. The lens 160 may provide a zooming feature and/or a focusing feature. The capture device 102n and/or the lens 160 may be implemented, in one example, as a single lens assembly. In another example, the lens 160 may be a separate implementation from the capture device 102n.

The capture device 102n may be configured to convert the input light LIN into computer readable data. The capture device 102n may capture data received through the lens 160 to generate raw pixel data. In some embodiments, the capture device 102n may capture data received through the lens 160 to generate bitstreams (e.g., generate video frames). For example, the capture devices 102n may receive focused light from the lens 160. The lens 160 may be directed, tilted, panned, zoomed and/or rotated to provide a targeted view from the apparatus 100 (e.g., a view for a video frame, a view for a panoramic video frame captured using multiple cameras, a target image and reference image view for stereo vision, etc.). The capture device 102n may generate a signal (e.g., VIDEO). For example, the signal VIDEO may be the signals SD_N. The signal VIDEO may be pixel data (e.g., a sequence of pixels that may be used to generate video frames). In some embodiments, the signal VIDEO may be video data (e.g., a sequence of video frames). The signal VIDEO may be presented to one of the inputs of the processor 112. In some embodiments, the pixel data generated by the capture device 102n may be uncompressed and/or raw data generated in response to the focused light from the lens 160. In some embodiments, the output of the capture device 102n may be digital video signals.

In an example, the capture device 102n may comprise a block (or circuit) 180, a block (or circuit) 182, and a block (or circuit) 184. The circuit 180 may be an image sensor. The circuit 182 may be a processor and/or logic. The circuit 184 may be a memory circuit (e.g., a frame buffer). The lens 160 (e.g., camera lens) may be directed to provide a view of an environment surrounding the camera system 102*n*. The lens 160 may be aimed to capture environmental data (e.g., the light input LIN). The lens 160 may be a wide-angle lens and/or fish-eye lens (e.g., lenses capable of capturing a wide field of view). The lens 160 may be configured to capture and/or focus the light for the capture device 102*n*. Generally, the image sensor 180 is located behind the lens 160. Based on the captured light from the lens 160, the capture device 102*n* may generate a bitstream and/or video data (e.g., the signal VIDEO).

The capture device 102*n* may be configured to capture video image data (e.g., light collected and focused by the lens 160). The capture device 102*n* may capture data received through the lens 160 to generate a video bitstream (e.g., pixel data for a sequence of video frames). In various embodiments, the lens 160 may be implemented as a fixed focus lens. A fixed focus lens generally facilitates smaller size and low power. In an example, a fixed focus lens may be used in battery powered, doorbell, and other low power camera applications. In some embodiments, the lens 160 may be directed, tilted, panned, zoomed and/or rotated to capture the environment surrounding the camera 102*n* (e.g., capture data from the field of view). In an example, professional camera models may be implemented with an active lens system for enhanced functionality, remote control, etc.

The capture device 102*n* may transform the received light into a digital data stream. In some embodiments, the capture device 102*n* may perform an analog to digital conversion. For example, the image sensor 180 may perform a photo-electric conversion of the light received by the lens 160. The processor/logic 182 may transform the digital data stream into a video data stream (or bitstream), a video file, and/or a number of video frames. In an example, the capture device 102*n* may present the video data as a digital video signal (e.g., VIDEO). The digital video signal may comprise the video frames (e.g., sequential digital images and/or audio). In some embodiments, the capture device 102*n* may comprise a microphone for capturing audio. In some embodiments, the microphone may be implemented as a separate component (e.g., one of the sensors 102*a*-102*n*).

The video data captured by the capture device 102*n* may be represented as a signal/bitstream/data VIDEO (e.g., a digital video signal). The capture device 102*n* may present the signal VIDEO to the processor/SoC 112. The signal VIDEO may represent the video frames/video data. The signal VIDEO may be a video stream captured by the capture device 102*n*. In some embodiments, the signal VIDEO may comprise pixel data that may be operated on by the processor 112 (e.g., a video processing pipeline, an image signal processor (ISP), etc.). The processor 112 may generate the video frames in response to the pixel data in the signal VIDEO.

The signal VIDEO may comprise pixel data arranged as video frames. The signal VIDEO may be images comprising a background (e.g., objects and/or the environment captured) and the speckle pattern generated by the structured light projector 150. The signal VIDEO may comprise single-channel source images. The single-channel source images may be generated in response to capturing the pixel data using the monocular lens 160.

The image sensor 180 may receive the input light LIN from the lens 160 and transform the light LIN into digital data (e.g., the bitstream). For example, the image sensor 180 may perform a photoelectric conversion of the light from the lens 160. In some embodiments, the image sensor 180 may have extra margins that are not used as part of the image output. In some embodiments, the image sensor 180 may not have extra margins. In various embodiments, the image sensor 180 may be implemented as an RGB sensor, an RGB-IR sensor, an RCCB sensor, a monocular image sensor, stereo image sensors, a thermal sensor, an event-based sensor, etc. For example, the image sensor 180 may be any type of sensor configured to provide sufficient output for computer vision operations to be performed on the output data (e.g., neural network-based detection). In the context of the embodiment shown, the image sensor 180 may be configured to generate an RGB-IR video signal. In an infrared light only illuminated field of view, the image sensor 180 may generate a monochrome (B/W) video signal. In a field of view illuminated by both IR light and visible light, the image sensor 180 may be configured to generate color information in addition to the monochrome video signal. In various embodiments, the image sensor 180 may be configured to generate a video signal in response to visible and/or infrared (IR) light.

In some embodiments, the camera sensor 180 may comprise a rolling shutter sensor or a global shutter sensor. In an example, the rolling shutter sensor 180 may implement an RGB-IR sensor. In some embodiments, the capture device 102*n* may comprise a rolling shutter IR sensor and an RGB sensor (e.g., implemented as separate components). In an example, the rolling shutter sensor 180 may be implemented as an RGB-IR rolling shutter complementary metal oxide semiconductor (CMOS) image sensor. In one example, the rolling shutter sensor 180 may be configured to assert a signal that indicates a first line exposure time. In one example, the rolling shutter sensor 180 may apply a mask to a monochrome sensor. In an example, the mask may comprise a plurality of units containing one red pixel, one green pixel, one blue pixel, and one IR pixel. The IR pixel may contain red, green, and blue filter materials that effectively absorb all of the light in the visible spectrum, while allowing the longer infrared wavelengths to pass through with minimal loss. With a rolling shutter, as each line (or row) of the sensor starts exposure, all pixels in the line (or row) may start exposure simultaneously.

The processor/logic 182 may transform the bitstream into a human viewable content (e.g., video data that may be understandable to an average person regardless of image quality, such as the video frames and/or pixel data that may be converted into video frames by the processor 112). For example, the processor/logic 182 may receive pure (e.g., raw) data from the image sensor 180 and generate (e.g., encode) video data (e.g., the bitstream) based on the raw data. The capture device 102*n* may have the memory 184 to store the raw data and/or the processed bitstream. For example, the capture device 102*n* may implement the frame memory and/or buffer 184 to store (e.g., provide temporary storage and/or cache) one or more of the video frames (e.g., the digital video signal). In some embodiments, the processor/logic 182 may perform analysis and/or correction on the video frames stored in the memory/buffer 184 of the capture device 102*n*. The processor/logic 182 may provide status information about the captured video frames.

The structured light projector 150 may comprise a block (or circuit) 186. The circuit 186 may implement a structured light source. The structured light source 186 may be configured to generate a signal (e.g., SLP). The signal SLP may be a structured light pattern (e.g., a speckle pattern). The signal SLP may be projected onto an environment near the structured light projector 150. The structured light pattern SLP may be captured by the capture device 102n as part of the light input LIN.

The structured light pattern lens 162 may be a lens for the structured light projector 150. The structured light pattern lens 162 may be configured to enable the structured light SLP generated by the structured light source 186 of the structured light projector 150 to be emitted while protecting the structured light source 186. The structured light pattern lens 162 may be configured to decompose the laser light pattern generated by the structured light source 186 into a pattern array (e.g., a dense dot pattern array for a speckle pattern).

In an example, the structured light source 186 may be implemented as an array of vertical-cavity surface-emitting lasers (VCSELs) and a lens. However, other types of structured light sources may be implemented to meet design criteria of a particular application. In an example, the array of VCSELs is generally configured to generate a laser light pattern (e.g., the signal SLP). The lens is generally configured to decompose the laser light pattern to a dense dot pattern array. In an example, the structured light source 186 may implement a near infrared (NIR) light source. In various embodiments, the light source of the structured light source 186 may be configured to emit light with a wavelength of approximately 940 nanometers (nm), which is not visible to the human eye. However, other wavelengths may be utilized. In an example, a wavelength in a range of approximately 800-1000 nm may be utilized.

The sensors 102a-102n may implement a number of sensors. In the example shown, sensor 102a may implement a lidar, the sensor 102b may implement a radar, and the sensor 102m may implement a thermal camera. The sensors 102a-102n may comprise other types of sensors including, but not limited to, motion sensors, ambient light sensors, proximity sensors (e.g., ultrasound, radar, passive infrared, lidar, etc.), audio sensors (e.g., a microphone), etc. In embodiments implementing a motion sensor, the sensors 102a-102n may be configured to detect motion anywhere in the field of view monitored by the apparatus 100 (or in some locations outside of the field of view). In various embodiments, the detection of motion may be used as one threshold for activating the capture device 102n. The sensors 102a-102n may be implemented as an internal component of the apparatus 100 and/or as a component external to the apparatus 100. In an example, the sensors 102a-102n may be implemented as a passive infrared (PIR) sensor. In another example, the sensors 102a-102n may be implemented as a smart motion sensor. In yet another example, the sensors 102a-102n may be implemented as a microphone. In embodiments implementing the smart motion sensor, the sensors 102a-102n may comprise a low resolution image sensor configured to detect motion and/or persons.

The lidar 102a may be configured to generate a point cloud of the environment 50 (e.g., representing distances to various objects measured by the lidar 102a). The radar 102b may be configured to generate a high resolution radar map of the environment 50. The thermal camera 102m may be configured to capture a thermal image (e.g., a heat map of the environment 50). Each of the sensors 102a-102n may provide an independent source of information about the environment 50. The number, type of sensor, and/or type of data generated by the sensors 102a-102n may be varied according to the design criteria of a particular implementation.

The signals SD_A-SD_M may comprise a variety of data (or information) collected by the sensors 102a-102m. In an example, the signals SD_A-SD_M may comprise data collected in response to motion being detected in the monitored field of view, an ambient light level in the monitored field of view, and/or sounds picked up in the monitored field of view. However, other types of data may be collected and/or generated based upon design criteria of a particular application. The signals SD_A-SD_M may be presented to the processor/SoC 112. In an example, the sensors 102a-102m may generate (assert) the signals SD_A-SD_M when motion is detected in the field of view monitored by the apparatus 100. In another example, the sensors 102a-102m may generate (assert) the signal SD_A-SD_M when triggered by audio in the field of view monitored by the apparatus 100. In still another example, the sensors 102a-102n may be configured to provide directional information with respect to motion and/or sound detected in the field of view. The directional information may also be communicated to the processor/SoC 112 via the signal SD_A-SD_M.

The HID 166 may implement an input device. For example, the HID 166 may be configured to receive human input. In one example, the HID 166 may be configured to receive a password input from a user. In another example, the HID 166 may be configured to receive user input in order to provide various parameters and/or settings to the processor 112 and/or the memory 114. In some embodiments, the apparatus 100 may include a keypad, a touch pad (or screen), a doorbell switch, and/or other human interface devices (HIDs) 166. In an example, the sensors 102a-102n may be configured to determine when an object is in proximity to the HIDs 166. In an example where the apparatus 100 is implemented as part of an access control application, the capture device 102n may be turned on to provide images for identifying a person attempting access, and illumination of a lock area and/or for an access touch pad 166 may be turned on. For example, a combination of input from the HIDs 166 (e.g., a password or PIN number) may be combined with the liveness judgment and/or depth analysis performed by the processor 112 to enable two-factor authentication. The HID 166 may present a signal (e.g., USR) to the processor 112. The signal USR may comprise the input received by the HID 166.

The processor/SoC 112 may receive the signal VIDEO, the signals SD_A-SD_M and/or the signal USR. The processor/SoC 112 may generate one or more video output signals (e.g., VIDOUT), one or more control signals (e.g., CTRL) and/or one or more depth data signals (e.g., DIMAGES) based on the signal VIDEO, the signals SD_A-SD_M, the signal USR and/or other input. In some embodiments, the signals VIDOUT, DIMAGES and CTRL may be generated based on analysis of the signal VIDEO and/or objects detected in the signal VIDEO.

In various embodiments, the processor/SoC 112 may be configured to perform one or more of feature extraction, object detection, object tracking, electronic image stabilization, 3D reconstruction, liveness detection and object identification. For example, the processor/SoC 112 may determine motion information and/or depth information by analyzing a frame from the signal VIDEO and comparing the frame to a previous frame. The comparison may be used to perform digital motion estimation. In some embodiments, the processor/SoC 112 may be configured to generate the video output signal VIDOUT comprising video data and/or the depth data signal DIMAGES comprising disparity maps and depth maps from the signal VIDEO. The video output signal VIDOUT and/or the depth data signal DIMAGES may be presented to the memory 114, the communications module 154, and/or the wireless interface 156. In some embodiments, the video signal VIDOUT and/or the depth data signal DIMAGES may be used internally by the processor 112 (e.g., not presented as output).

The signal VIDOUT may be presented to the communication device 156. In some embodiments, the signal VIDOUT may comprise encoded video frames generated by the processor 112. In some embodiments, the encoded video frames may comprise a full video stream (e.g., encoded video frames representing all video captured by the capture device 102n). The encoded video frames may be encoded, cropped, stitched, stabilized and/or enhanced versions of the pixel data received from the signal VIDEO. In an example, the encoded video frames may be a high resolution, digital, encoded, de-warped, stabilized, cropped, blended, stitched and/or rolling shutter effect corrected version of the signal VIDEO.

In some embodiments, the signal VIDOUT may be generated based on video analytics (e.g., computer vision operations) performed by the processor 112 on the video frames generated. The processor 112 may be configured to perform the computer vision operations to detect objects and/or events in the video frames and then convert the detected objects and/or events into statistics and/or parameters. In one example, the data determined by the computer vision operations may be converted to the human-readable format by the processor 112. The data from the computer vision operations may be used to detect objects and/or events. The computer vision operations may be performed by the processor 112 locally (e.g., without communicating to an external device to offload computing operations). Similarly, other video processing and/or encoding operations (e.g., stabilization, compression, stitching, cropping, rolling shutter effect correction, etc.) may be performed by the processor 112 locally. For example, the locally performed computer vision operations may enable the computer vision operations to be performed by the processor 112 and avoid heavy video processing running on back-end servers. Avoiding video processing running on back-end (e.g., remotely located) servers may preserve privacy.

In some embodiments, the signal VIDOUT may be data generated by the processor 112 (e.g., video analysis results, audio/speech analysis results, etc.) that may be communicated to a cloud computing service in order to aggregate information and/or provide training data for machine learning (e.g., to improve object detection, to improve audio detection, to improve liveness detection, etc.). In some embodiments, the signal VIDOUT may be provided to a cloud service for mass storage (e.g., to enable a user to retrieve the encoded video using a smartphone and/or a desktop computer). In some embodiments, the signal VIDOUT may comprise the data extracted from the video frames (e.g., the results of the computer vision), and the results may be communicated to another device (e.g., a remote server, a cloud computing system, etc.) to offload analysis of the results to another device (e.g., offload analysis of the results to a cloud computing service instead of performing all the analysis locally). The type of information communicated by the signal VIDOUT may be varied according to the design criteria of a particular implementation.

The signal CTRL may be configured to provide a control signal. The signal CTRL may be generated in response to decisions made by the processor 112. In one example, the signal CTRL may be generated in response to objects detected and/or characteristics extracted from the video frames. The signal CTRL may be configured to enable, disable, change a mode of operation of another device. In one example, a door controlled by an electronic lock may be locked/unlocked in response the signal CTRL. In another example, a device may be set to a sleep mode (e.g., a low-power mode) and/or activated from the sleep mode in response to the signal CTRL. In yet another example, an alarm and/or a notification may be generated in response to the signal CTRL. The type of device controlled by the signal CTRL, and/or a reaction performed by of the device in response to the signal CTRL may be varied according to the design criteria of a particular implementation.

The signal CTRL may be generated based on data received by the sensors 102a-102n (e.g., a temperature reading, a motion sensor reading, etc.). The signal CTRL may be generated based on input from the HID 166. The signal CTRL may be generated based on behaviors of people detected in the video frames by the processor 112. The signal CTRL may be generated based on a type of object detected (e.g., a person, an animal, a vehicle, etc.). The signal CTRL may be generated in response to particular types of objects being detected in particular locations. The signal CTRL may be generated in response to user input in order to provide various parameters and/or settings to the processor 112 and/or the memory 114. The processor 112 may be configured to generate the signal CTRL in response to sensor fusion operations (e.g., aggregating information received from disparate sources). The processor 112 may be configured to generate the signal CTRL in response to results of liveness detection performed by the processor 112. The conditions for generating the signal CTRL may be varied according to the design criteria of a particular implementation.

The signal DIMAGES may comprise one or more of depth maps and/or disparity maps generated by the processor 112. The signal DIMAGES may be generated in response to 3D reconstruction performed on the monocular single-channel images. The signal DIMAGES may be generated in response to analysis of the captured video data and the structured light pattern SLP.

The multi-step approach to activating and/or disabling the capture device 102n based on the output of the motion sensor (e.g., one of the sensors 102a-102n) and/or any other power consuming features of the apparatus 100 may be implemented to reduce a power consumption of the apparatus 100 and extend an operational lifetime of the battery 152. A motion sensor of the sensors 102a-102n may have a low drain on the battery 152 (e.g., less than 10 W). In an example, the motion sensor of the sensors 102a-102n may be configured to remain on (e.g., always active) unless disabled in response to feedback from the processor/SoC 112. The video analytics performed by the processor/SoC 112 may have a relatively large drain on the battery 152 (e.g., greater than the motion sensor). In an example, the processor/SoC 112 may be in a low-power state (or power-down) until some motion is detected by the motion sensor of the sensors 102a-102n.

The apparatus 100 may be configured to operate using various power states. For example, in the power-down state (e.g., a sleep state, a low-power state) the motion sensor of the sensors 102a-102n and the processor/SoC 112 may be on and other components of the apparatus 100 (e.g., the image capture device 102n, the memory 114, the communications module 154, etc.) may be off. In another example, the apparatus 100 may operate in an intermediate state. In the intermediate state, the image capture device 102n may be on and the memory 114 and/or the communications module 154 may be off. In yet another example, the apparatus 100 may operate in a power-on (or high power) state. In the power-on state, the sensors 102a-102n, the processor/SoC 112, the capture device 102*n*, the memory 114, and/or the communications module 154 may be on. The apparatus 100 may consume some power from the battery 152 in the power-down state (e.g., a relatively small and/or minimal amount of power). The apparatus 100 may consume more power from the battery 152 in the power-on state. The number of power states and/or the components of the apparatus 100 that are on while the apparatus 100 operates in each of the power states may be varied according to the design criteria of a particular implementation.

In some embodiments, the apparatus 100 may be implemented as a system on chip (SoC). For example, the apparatus 100 may be implemented as a printed circuit board comprising one or more components. The apparatus 100 may be configured to perform intelligent video analysis on the video frames of the video. The apparatus 100 may be configured to crop and/or enhance the video.

In some embodiments, the video frames may be some view (or derivative of some view) captured by the capture device 102*n*. The pixel data signals may be enhanced by the processor 112 (e.g., color conversion, noise filtering, auto exposure, auto white balance, auto focus, etc.). In some embodiments, the video frames may provide a series of cropped and/or enhanced video frames that improve upon the view from the perspective of the camera 102*n* (e.g., provides night vision, provides High Dynamic Range (HDR) imaging, provides more viewing area, highlights detected objects, provides additional data such as a numerical distance to detected objects, etc.) to enable the processor 112 to see the location better than a person would be capable of with human vision.

The encoded video frames may be processed locally. In one example, the encoded video may be stored locally by the memory 114 to enable the processor 112 to facilitate the computer vision analysis internally (e.g., without first uploading video frames to a cloud service). The processor 112 may be configured to select the video frames to be packetized as a video stream that may be transmitted over a network (e.g., a bandwidth limited network).

In some embodiments, the processor 112 may be configured to perform sensor fusion operations. The sensor fusion operations performed by the processor 112 may be configured to analyze information from multiple sources (e.g., the capture device 102*n*, the sensors 102*a*-102*n* and the HID 166). By analyzing various data from disparate sources, the sensor fusion operations may be capable of making inferences about the data that may not be possible from one of the data sources alone. For example, the sensor fusion operations implemented by the processor 112 may analyze video data (e.g., mouth movements of people) as well as the speech patterns from directional audio. The disparate sources may be used to develop a model of a scenario to support decision making. For example, the processor 112 may be configured to compare the synchronization of the detected speech patterns with the mouth movements in the video frames to determine which person in a video frame is speaking. The sensor fusion operations may also provide time correlation, spatial correlation and/or reliability among the data being received.

In some embodiments, the processor 112 may implement convolutional neural network capabilities. The convolutional neural network capabilities may implement computer vision using deep learning techniques. The convolutional neural network capabilities may be configured to implement pattern and/or image recognition using a training process through multiple layers of feature-detection. The computer vision and/or convolutional neural network capabilities may be performed locally by the processor 112. In some embodiments, the processor 112 may receive training data and/or feature set information from an external source. For example, an external device (e.g., a cloud service) may have access to various sources of data to use as training data that may be unavailable to the apparatus 100. However, the computer vision operations performed using the feature set may be performed using the computational resources of the processor 112 within the apparatus 100.

A video pipeline of the processor 112 may be configured to locally perform de-warping, cropping, enhancements, rolling shutter corrections, stabilizing, downscaling, packetizing, compression, conversion, blending, synchronizing and/or other video operations. The video pipeline of the processor 112 may enable multi-stream support (e.g., generate multiple bitstreams in parallel, each comprising a different bitrate). In an example, the video pipeline of the processor 112 may implement an image signal processor (ISP) with a 320 MPixels/s input pixel rate. The architecture of the video pipeline of the processor 112 may enable the video operations to be performed on high resolution video and/or high bitrate video data in real-time and/or near real-time. The video pipeline of the processor 112 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline may enable 4K ultra high resolution with H.264 encoding at double real time speed (e.g., 60 fps), 4K ultra high resolution with H.265/HEVC at 30 fps and/or 4K AVC encoding (e.g., 4KP30 AVC and HEVC encoding with multi-stream support). The type of video operations and/or the type of video data operated on by the processor 112 may be varied according to the design criteria of a particular implementation.

The camera sensor 180 may implement a high-resolution sensor. Using the high resolution sensor 180, the processor 112 may combine over-sampling of the image sensor 180 with digital zooming within a cropped area. The over-sampling and digital zooming may each be one of the video operations performed by the processor 112. The over-sampling and digital zooming may be implemented to deliver higher resolution images within the total size constraints of a cropped area.

In some embodiments, the lens 160 may implement a fisheye lens. One of the video operations implemented by the processor 112 may be a dewarping operation. The processor 112 may be configured to dewarp the video frames generated. The dewarping may be configured to reduce and/or remove acute distortion caused by the fisheye lens and/or other lens characteristics. For example, the dewarping may reduce and/or eliminate a bulging effect to provide a rectilinear image.

The processor 112 may be configured to crop (e.g., trim to) a region of interest from a full video frame (e.g., generate the region of interest video frames). The processor 112 may generate the video frames and select an area. In an example, cropping the region of interest may generate a second image. The cropped image (e.g., the region of interest video frame) may be smaller than the original video frame (e.g., the cropped image may be a portion of the captured video).

The area of interest may be dynamically adjusted based on the location of an audio source. For example, the detected audio source may be moving, and the location of the detected audio source may move as the video frames are captured. The processor 112 may update the selected region of interest coordinates and dynamically update the cropped section (e.g., directional microphones implemented as one or more of the sensors $102a$-$102n$ may dynamically update the location based on the directional audio captured). The cropped section may correspond to the area of interest selected. As the area of interest changes, the cropped portion may change. For example, the selected coordinates for the area of interest may change from frame to frame, and the processor 112 may be configured to crop the selected region in each frame.

The processor 112 may be configured to over-sample the image sensor 180. The over-sampling of the image sensor 180 may result in a higher resolution image. The processor 112 may be configured to digitally zoom into an area of a video frame. For example, the processor 112 may digitally zoom into the cropped area of interest. For example, the processor 112 may establish the area of interest based on the directional audio, crop the area of interest, and then digitally zoom into the cropped region of interest video frame.

The dewarping operations performed by the processor 112 may adjust the visual content of the video data. The adjustments performed by the processor 112 may cause the visual content to appear natural (e.g., appear as seen by a person viewing the location corresponding to the field of view of the capture device $102n$). In an example, the dewarping may alter the video data to generate a rectilinear video frame (e.g., correct artifacts caused by the lens characteristics of the lens 160). The dewarping operations may be implemented to correct the distortion caused by the lens 160. The adjusted visual content may be generated to enable more accurate and/or reliable object detection.

Various features (e.g., dewarping, digitally zooming, cropping, etc.) may be implemented in the processor 112 as hardware modules. Implementing hardware modules may increase the video processing speed of the processor 112 (e.g., faster than a software implementation). The hardware implementation may enable the video to be processed while reducing an amount of delay. The hardware components used may be varied according to the design criteria of a particular implementation.

In some embodiments, the processor 112 may implement one or more coprocessors, cores and/or chiplets. For example, the processor 112 may implement one coprocessor configured as a general purpose processor and another coprocessor configured as a video processor. In some embodiments, the processor 112 may be a dedicated hardware module designed to perform particular tasks. In an example, the processor 112 may implement an AI accelerator. In another example, the processor 112 may implement a radar processor. In yet another example, the processor 112 may implement a dataflow vector processor. In some embodiments, other processors implemented by the apparatus 100 may be generic processors and/or video processors (e.g., a coprocessor that is physically a different chipset and/or silicon from the processor 112). In one example, the processor 112 may implement an x86-64 instruction set. In another example, the processor 112 may implement an ARM instruction set. In yet another example, the processor 112 may implement a RISC-V instruction set. The number of cores, coprocessors, the design optimization and/or the instruction set implemented by the processor 112 may be varied according to the design criteria of a particular implementation.

The processor 112 is shown comprising a number of blocks (or circuits) $190a$-$190n$. The blocks $190a$-$190n$ may implement various hardware modules implemented by the processor 112. The hardware modules $190a$-$190n$ may be configured to provide various hardware components to implement a video processing pipeline, a radar signal processing pipeline and/or an AI processing pipeline. The circuits $190a$-$190n$ may be configured to receive the pixel data VIDEO, generate the video frames from the pixel data, perform various operations on the video frames (e.g., dewarping, rolling shutter correction, cropping, upscaling, image stabilization, 3D reconstruction, liveness detection, auto-exposure, etc.), prepare the video frames for communication to external hardware (e.g., encoding, packetizing, color correcting, etc.), parse feature sets, implement various operations for computer vision (e.g., object detection, segmentation, classification, etc.), etc. The hardware modules $190a$-$190n$ may be configured to implement various security features (e.g., secure boot, I/O virtualization, etc.). Various implementations of the processor 112 may not necessarily utilize all the features of the hardware modules $190a$-$190n$. The features and/or functionality of the hardware modules $190a$-$190n$ may be varied according to the design criteria of a particular implementation. Details of the hardware modules $190a$-$190n$ may be described in association with U.S. patent application Ser. No. 16/831,549, filed on Apr. 16, 2020 (now U.S. Pat. No. 11,586,843), U.S. patent application Ser. No. 16/288,922, filed on Feb. 28, 2019 (now U.S. Pat. No. 11,001,231), U.S. patent application Ser. No. 15/593,493, filed on May 12, 2017 (now U.S. Pat. No. 10,437,600), U.S. patent application Ser. No. 15/931,942, filed on May 14, 2020(now U.S. Pat. No. 11,645,706), U.S. patent application Ser. No. 16/991,344, filed on Aug. 12, 2020 (now U.S. Pat. No. 12,374,107), U.S. patent application Ser. No. 17/479,034, filed on Sep. 20, 2021 (now U.S. Pat. No. 12,002,229), appropriate portions of which are hereby incorporated by reference in their entirety.

The hardware modules $190a$-$190n$ may be implemented as dedicated hardware modules. Implementing various functionality of the processor 112 using the dedicated hardware modules $190a$-$190n$ may enable the processor 112 to be highly optimized and/or customized to limit power consumption, reduce heat generation and/or increase processing speed compared to software implementations. The hardware modules $190a$-$190n$ may be customizable and/or programmable to implement multiple types of operations. Implementing the dedicated hardware modules $190a$-$190n$ may enable the hardware used to perform each type of calculation to be optimized for speed and/or efficiency. For example, the hardware modules $190a$-$190n$ may implement a number of relatively simple operations that are used frequently in computer vision operations that, together, may enable the computer vision operations to be performed in real-time. The video pipeline may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects. The hardware modules $190a$-$190n$ may enable computationally intensive operations (e.g., computer vision operations, video encoding, video transcoding, 3D reconstruction, depth map generation, liveness detection, etc.) to be performed locally by the apparatus 100.

One of the hardware modules $190a$-$190n$ (e.g., $190a$) may implement a scheduler circuit. The scheduler circuit 190a may be configured to store a directed acyclic graph (DAG). In an example, the scheduler circuit 190a may be configured to generate and store the directed acyclic graph in response to the feature set information received (e.g., loaded). The directed acyclic graph may define the video operations to perform for extracting the data from the video frames. For example, the directed acyclic graph may define various mathematical weighting (e.g., neural network weights and/or biases) to apply when performing computer vision operations to classify various groups of pixels as particular objects.

The scheduler circuit 190a may be configured to parse the acyclic graph to generate various operators. The operators may be scheduled by the scheduler circuit 190a in one or more of the other hardware modules 190a-190n. For example, one or more of the hardware modules 190a-190n may implement hardware engines configured to perform specific tasks (e.g., hardware engines designed to perform particular mathematical operations that are repeatedly used to perform computer vision operations). The scheduler circuit 190a may schedule the operators based on when the operators may be ready to be processed by the hardware engines 190a-190n.

The scheduler circuit 190a may time multiplex the tasks to the hardware modules 190a-190n based on the availability of the hardware modules 190a-190n to perform the work. The scheduler circuit 190a may parse the directed acyclic graph into one or more data flows. Each data flow may include one or more operators. Once the directed acyclic graph is parsed, the scheduler circuit 190a may allocate the data flows/operators to the hardware engines 190a-190n and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One of the hardware modules 190a-190n (e.g., 190b) may implement an artificial neural network (ANN) module. The artificial neural network module may be implemented as a fully connected neural network or a convolutional neural network (CNN). In an example, fully connected networks are "structure agnostic" in that there are no special assumptions that need to be made about an input. A fully-connected neural network comprises a series of fully-connected layers that connect every neuron in one layer to every neuron in the other layer. In a fully-connected layer, for n inputs and m outputs, there are n*m weights. There is also a bias value for each output node, resulting in a total of (n+1)*m parameters. In an already-trained neural network, the (n+1)*m parameters have already been determined during a training process. An already-trained neural network generally comprises an architecture specification and the set of parameters (weights and biases) determined during the training process. In another example, CNN architectures may make explicit assumptions that the inputs are images to enable encoding particular properties into a model architecture. The CNN architecture may comprise a sequence of layers with each layer transforming one volume of activations to another through a differentiable function.

In the example shown, the artificial neural network 190b may implement a convolutional neural network (CNN) module. The CNN module 190b may be configured to perform the computer vision operations on the video frames. The CNN module 190b may be configured to implement recognition of objects through multiple layers of feature detection. The CNN module 190b may be configured to calculate descriptors based on the feature detection performed. The descriptors may enable the processor 112 to determine a likelihood that pixels of the video frames correspond to particular objects (e.g., a particular make/model/year of a vehicle, identifying a person as a particular individual, detecting a type of animal, detecting characteristics of a face, etc.).

The CNN module 190b may be configured to implement convolutional neural network capabilities. The CNN module 190b may be configured to implement computer vision using deep learning techniques. The CNN module 190b may be configured to implement pattern and/or image recognition using a training process through multiple layers of feature-detection. The CNN module 190b may be configured to conduct inferences against a machine learning model.

The CNN module 190b may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching operation is generally incorporated by hardware in the CNN module 190b to find the most probable correspondences between feature points in a reference video frame and a target video frame. In a process to match pairs of reference and target feature points, each feature point may be represented by a descriptor (e.g., image patch, SIFT, BRIEF, ORB, FREAK, etc.). Implementing the CNN module 190b using dedicated hardware circuitry may enable calculating descriptor matching distances in real time.

The CNN module 190b may be configured to perform face detection, face recognition and/or liveness judgment. For example, face detection, face recognition and/or liveness judgment may be performed based on a trained neural network implemented by the CNN module 190b. In some embodiments, the CNN module 190b may be configured to generate the depth image from the structured light pattern. The CNN module 190b may be configured to perform various detection and/or recognition operations and/or perform 3D recognition operations.

The CNN module 190b may be a dedicated hardware module configured to perform feature detection of the video frames. The features detected by the CNN module 190b may be used to calculate descriptors. The CNN module 190b may determine a likelihood that pixels in the video frames belong to a particular object and/or objects in response to the descriptors. For example, using the descriptors, the CNN module 190b may determine a likelihood that pixels correspond to a particular object (e.g., a person, an item of furniture, a pet, a vehicle, etc.) and/or characteristics of the object (e.g., shape of eyes, distance between facial features, a hood of a vehicle, a body part, a license plate of a vehicle, a face of a person, clothing worn by a person, etc.). Implementing the CNN module 190b as a dedicated hardware module of the processor 112 may enable the apparatus 100 to perform the computer vision operations locally (e.g., on-chip) without relying on processing capabilities of a remote device (e.g., communicating data to a cloud computing service).

The computer vision operations performed by the CNN module 190b may be configured to perform the feature detection on the video frames in order to generate the descriptors. The CNN module 190b may perform the object detection to determine regions of the video frame that have a high likelihood of matching the particular object. In one example, the types of object(s) to match against (e.g., reference objects) may be customized using an open operand stack (enabling programmability of the processor 112 to implement various artificial neural networks defined by directed acyclic graphs each providing instructions for performing various types of object detection). The CNN module 190b may be configured to perform local masking to the region with the high likelihood of matching the particular object(s) to detect the object.

In some embodiments, the CNN module 190b may determine the position (e.g., 3D coordinates and/or location coordinates) of various features (e.g., the characteristics) of the detected objects. In one example, the location of the arms, legs, chest and/or eyes of a person may be determined using 3D coordinates. One location coordinate on a first axis for a vertical location of the body part in 3D space and another coordinate on a second axis for a horizontal location of the body part in 3D space may be stored. In some embodiments, the distance from the lens 160 may represent one coordinate (e.g., a location coordinate on a third axis) for a depth location of the body part in 3D space. Using the location of various body parts in 3D space, the processor 112 may determine body position, and/or body characteristics of detected people.

The CNN module 190b may be pre-trained (e.g., configured to perform computer vision to detect objects based on the training data received to train the CNN module 190b). For example, the results of training data (e.g., a machine learning model) may be pre-programmed and/or loaded into the processor 112. The CNN module 190b may conduct inferences against the machine learning model (e.g., to perform object detection). The training may comprise determining weight values for each layer of the neural network model. For example, weight values may be determined for each of the layers for feature extraction (e.g., a convolutional layer) and/or for classification (e.g., a fully connected layer). The weight values learned by the CNN module 190b may be varied according to the design criteria of a particular implementation.

The CNN module 190b may implement the feature extraction and/or object detection by performing convolution operations. The convolution operations may be hardware accelerated for fast (e.g., real-time) calculations that may be performed while consuming low power. In some embodiments, the convolution operations performed by the CNN module 190b may be utilized for performing the computer vision operations. In some embodiments, the convolution operations performed by the CNN module 190b may be utilized for any functions performed by the processor 112 that may involve calculating convolution operations (e.g., 3D reconstruction).

The convolution operation may comprise sliding a feature detection window along the layers while performing calculations (e.g., matrix operations). The feature detection window may apply a filter to pixels and/or extract features associated with each layer. The feature detection window may be applied to a pixel and a number of surrounding pixels. In an example, the layers may be represented as a matrix of values representing pixels and/or features of one of the layers and the filter applied by the feature detection window may be represented as a matrix. The convolution operation may apply a matrix multiplication between the region of the current layer covered by the feature detection window. The convolution operation may slide the feature detection window along regions of the layers to generate a result representing each region. The size of the region, the type of operations applied by the filters and/or the number of layers may be varied according to the design criteria of a particular implementation.

Using the convolution operations, the CNN module 190b may compute multiple features for pixels of an input image in each extraction step. For example, each of the layers may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window operates on a pixel and nearby pixels (or sub-pixels), the results of the operation may have location invariance. The layers may comprise convolution layers, pooling layers, non-linear layers and/or fully connected layers. In an example, the convolution operations may learn to detect edges from raw pixels (e.g., a first layer), then use the feature from the previous layer (e.g., the detected edges) to detect shapes in a next layer and then use the shapes to detect higher-level features (e.g., facial features, pets, vehicles, components of a vehicle, furniture, etc.) in higher layers and the last layer may be a classifier that uses the higher level features.

The CNN module 190b may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 190b to extract features from the training data may be varied according to the design criteria of a particular implementation.

One or more of the hardware modules 190a-190n may be configured to implement other types of AI models. In one example, the hardware modules 190a-190n may be configured to implement an image-to-text AI model and/or a video-to-text AI model. In another example, the hardware modules 190a-190n may be configured to implement a Large Language Model (LLM). Implementing the AI model(s) using the hardware modules 190a-190n may provide AI acceleration that may enable complex AI tasks to be performed on an edge device such as the apparatus 100.

One of the hardware modules 190a-190n (e.g., 190c) may implement a sensor fusion module. The sensor fusion module 190c may be configured to receive the data from the sensors 102a-102n. In an example, the sensor fusion module 190c may be configured to receive a point cloud generated by the lidar 102a. In another example, the sensor fusion module 190c may be configured to receive a high resolution radar map from the radar module 102b. In yet another example, the sensor fusion module 190c may be configured to receive a thermal image from the thermal camera 102n. The sensor fusion module 190c may be configured to analyze independent sources of data together in order to make inferences about the data (e.g., inferences that may not be capable of determining from each individual data source, alone). The sensor fusion module 190c may be configured to determine the inferences in response to an analysis of the sensor data (e.g., provided by the signals SD_A-SD_M) and the video frames. For example, a combination of information from the video frames and the sensor data may provide additional context about the environment 50.

One of the hardware modules 190a-190n may be configured to perform the virtual aperture imaging. One of the hardware modules 190a-190n may be configured to perform transformation operations (e.g., FFT, DCT, DFT, etc.). The number, type and/or operations performed by the hardware modules 190a-190n may be varied according to the design criteria of a particular implementation.

Each of the hardware modules 190a-190n may implement a processing resource (or hardware resource or hardware engine). The hardware engines 190a-190n may be operational to perform specific processing tasks. In some configurations, the hardware engines 190a-190n may operate in parallel and independent of each other. In other configurations, the hardware engines 190a-190n may operate collectively among each other to perform allocated tasks. One or more of the hardware engines 190a-190n may be homogeneous processing resources (all circuits 190a-190n may have the same capabilities) or heterogeneous processing resources (two or more circuits 190a-190n may have different capabilities).

Figure 4:
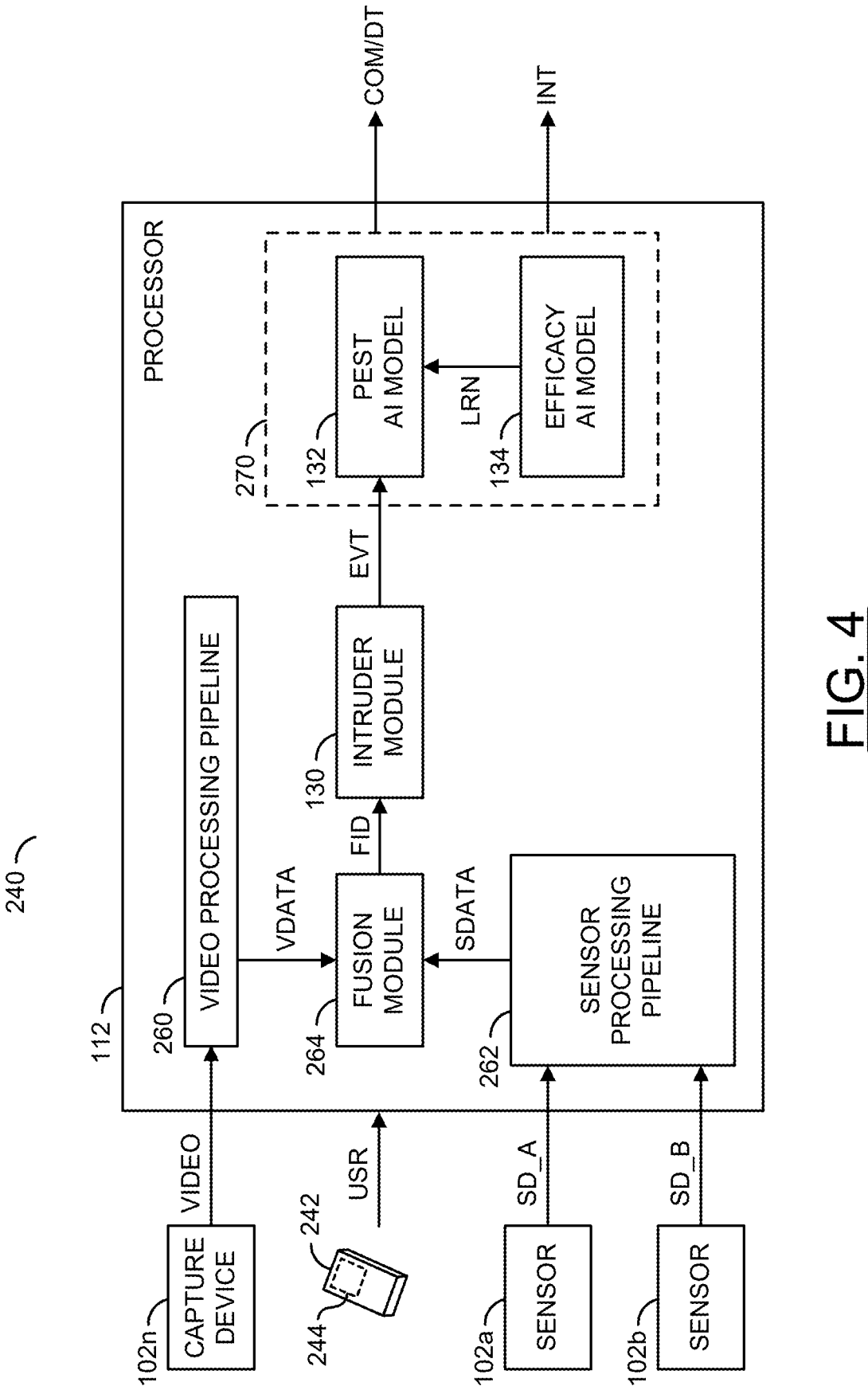
FIG. 4 is a block diagram illustrating AI models implemented by a processor to perform sensor to text extraction and record events.

Referring to FIG. 4, a block diagram illustrating AI models implemented by a processor to perform sensor to text extraction and record events is shown. An example implementation 240 is shown. The example implementation 240 may be a representative example of implementing AI models to perform text extraction and/or pest detection by the apparatus 100. In some embodiments, the AI models may be implemented on the apparatus 100 (e.g., without offloading computation to a cloud computing service). In some embodiments, one or more of the AI models may be implemented by a cloud computing service. Whether the AI models may be implemented on the edge device (e.g., the apparatus 100) as shown in the example implementation 240 may depend on the processing capabilities of the processor 112, a power budget and/or a complexity of the AI models implemented.

The example implementation 240 may comprise the processor 112, the sensors 102a-102b, the capture device 102n and/or a block (or circuit) 242. The circuit 242 may implement a user device. The example implementation 240 may comprise other components (not shown) such as the memory 114 and/or the deterrence device 104. For example, the memory 114 may be remotely located off-site (e.g., implemented by a cloud computing service). In the example shown, three of the sensors 102a-102n may be implemented (e.g., the sensors 102a-102b and the capture device 102n). Some embodiments may implement more or fewer of the sensors 102a-102n. The sensor 102a may present the signal SD_A to the processor 112, the sensor 102b may present the signal SD_B to the processor 112 and the capture device may present the signal VIDEO (e.g., SD_N) to the processor 112.

The signal USR may be received by the processor 112 (or the interface 110a-110b, not shown). In one example, the signal USR may be provided by the user device 242. For example, the user device 242 may be a smartphone, a desktop computer, a laptop computer, a tablet computing device, a smartwatch, a security terminal, etc. The user device 242 is shown implementing a block (or circuit) 244. The block 244 may be a companion application. The companion application 244 may comprise computer readable instructions that may be stored by a memory and/or executed by a processor implemented by the user device 242. In one example, a companion application 244 may be configured to operate on the user device 242 to enable communication with the apparatus 100. The companion application 244 may enable users to adjust settings of the apparatus 100, the sensors 102a-102n, the deterrent devices 104 (e.g., control a volume of speakers used to deter pests, select custom sounds, manually adjust light brightness, etc.), the pest AI model 132, the efficacy AI model 134, etc. The companion application 244 may enable users to view video captured by the capture device 102n. The companion application 244 may enable a user to view the event records and/or tune various parameters of the pest AI model 132 (e.g., provide constraints to the countermeasures selected, provide user preferences for the countermeasures selected, identify potential intruders that may not be pests, etc.). Generally, the user device 242 may comprise a display (e.g., for image and/or video output), a speaker (e.g., for audio output), an input device (e.g., a keyboard, a touchscreen display, a microphone, etc.) and/or a communication device. The companion app 244 may be configured to receive notifications (e.g., text, push, audio, video, etc.).

The processor 112 may comprise the intruder module 130, a block (or circuit) 260, a block (or circuit) 262, a block (or circuit) 264 and/or a block (or circuit) 270. The circuit 260 may implement a video processing pipeline. The circuit 262 may implement a sensor processing pipeline. The circuit 264 may implement a fusion module. The circuit 270 may implement an AI module. The processor 112 may comprise other components (not shown). One or more of the components 260-270 may be implemented by programming the hardware modules 190a-190n. The number, type and/or arrangement of the components of the processor 112 may be varied according to the design criteria of a particular implementation.

The video processing pipeline 260 may be configured to receive the signal VIDEO. The video processing pipeline 260 may be configured to generate a signal (e.g., VDATA) in response to the signal VIDEO. The signal VDATA may comprise preprocessed video data. The video processing pipeline 260 may be configured to present the signal VDATA to the fusion module 264. In some embodiments, the video processing pipeline 260 may be configured to present the signal VDATA to the memory 114 (e.g., for storage).

The video processing pipeline 260 may be configured to receive the pixel data in the signal VIDEO. The video processing pipeline 260 may be configured to process the pixel data arranged as video frames. The signal VDATA may comprise the video frames generated by the video processing pipeline 260. In some embodiments, the video frames generated by the video processing pipeline 260 may comprise encoded video frames. In some embodiments, the video frames generated by the video processing pipeline 260 may comprise raw data that may be used for various types of analysis (e.g., motion detection, object detection, cropping, auto-balance, depth analysis, behavior detection, cropping, stabilization, upscaling, downscaling, dewarping, formatting for an output device, etc.) as described in association with FIG. 2. The video processing pipeline 260 may be configured to prepare the raw pixel data for further analysis by the fusion module 264 and/or for computer vision operations. In some embodiments, the video processing pipeline 260 may be configured to prepare the raw pixel data for communication to other devices and/or for storage in the memory 114.

The sensor processing pipeline 262 may be configured to receive the sensor data SD_A-SD_B. In some embodiments, the sensor processing pipeline 262 may be configured to receive the sensor data SD_A-SD_B for data types that are not video data. In some embodiments, individual processing pipelines may be implemented for each type of sensor data (e.g., a lidar processing pipeline, an audio processing pipeline, a radar processing pipeline, etc.). Details of radar processing may be described in association with U.S. patent application Ser. No. 18/140,958, filed on Apr. 28, 2023, U.S. patent application Ser. No. 18/129,834, filed on Apr. 1, 2023, and/or U.S. patent application Ser. No. 18/511,719, filed on Nov. 16, 2023, appropriate portions of which are incorporated by reference. The signal processing pipeline 262 may be configured to generate a signal (e.g., SDATA) in response to the signals SD_A-SD_B. The signal SDATA may comprise preprocessed sensor data. The sensor processing pipeline 262 may be configured to present the signal SDATA to the fusion module 264. In some embodiments, the sensor processing pipeline 262 may be configured to present the signal SDATA to the memory 114 (e.g., for storage).

The signal processing pipeline 262 may be configured to receive the raw sensor data in the signals SD_A-SD_B. The signal processing pipeline 262 may be configured to process the raw sensor data. The raw sensor data may comprise timestamp information. The signal SDATA may comprise the processed sensor data generated by the signal processing pipeline 262. In some embodiments, the signal SDATA generated by the signal processing pipeline 262 may comprise detection information (e.g., whether a motion sensor crossed a threshold, audio converted to text, object size and/or location information determined by a radar system, etc.). In some embodiments, the sensor processing pipeline 262 may normalize the raw sensor data. The sensor processing pipeline 262 may be configured to prepare the sensor data for further analysis by the fusion module 264. In some embodiments, the sensor processing pipeline 262 may be configured to prepare the sensor data for communication to other devices and/or for storage in the memory 114.

The fusion module 264 may be configured to perform sensor fusion operations. The fusion module 264 may be configured to analyze information from multiple sensors (e.g., the capture device 102n and the sensors 102a-102b, in the example shown) for redundancy. By analyzing various data from disparate sources, the fusion module 264 may be capable of making inferences about the data that may not be possible from one of the data sources alone. For example, the fusion module 264 may analyze video data as well as radar, LIDAR, inertial, motion, location data (e.g., GPS, GNSS, etc.), gaze direction, battery status and/or other sources to develop a model of a scenario to support decision making. The fusion module 264 may also provide time correlation, spatial correlation and/or reliability among the data being received from the different sensors 102a-102n. The fusion module 264 may be configured to analyze the same data (e.g., of the environment 50) in different ways to provide a higher level of understanding of the data. The fusion module 264 may be further configured to provide redundancy (e.g., radar and LIDAR may be used to supplement incomplete video data when a camera lens is obstructed).

The fusion module 264 may be configured to combine data from multiple sensors to obtain an accurate and reliable representation of the environment 50. By combining the data from multiple sensors, the fusion module 264 may reduce an amount of uncertainty and/or noise with respect to each individual sensor measurement, provide and/or increase an amount of data redundancy and availability, and/or enable an extraction of features and/or insights that may not be possible from any single sensor (or sensor data type). The fusion module 264 may utilize various complementary strengths and/or advantages of different sensors (or sensor data types) in order to compensate for various weaknesses of different sensors (or sensor data types). For example, the high resolution, color representation and/or visual detail of sensor data provided by a high resolution camera may complement the large number of data points and/or penetrative capability of radar data to enable the data from the high resolution camera data to provide additional details that radar data is not capable of capturing while the radar data may provide data when the high resolution camera is obstructed (e.g., due to fog and/or dirt). The fusion module 264 may enable the combination of sensor data to enhance accuracy and/or robustness, extend coverage and/or provide additional data points for enable complex decision-making. In some embodiments, the fusion module 264 may be configured to translate different data types into a common dimension and/or scale in order to enable heterogeneous data types to be correlated. The fusion module 264 may be configured to select various fusion techniques and/or implement particular hardware modules to perform the calculations for evaluating the fused data (e.g., without relying on computation resources of other components such as video processors and/or general purpose processors).

The fusion module 264 may be configured to acquire raw sensor data about the environment 50 received from the various sensors (e.g., images, distances, velocities, etc.). In some embodiments, the fusion module 264 may be configured to perform preprocessing on the raw sensor data to remove noise, correct for distortions, and/or calibrate measurements. The fusion module 264 may be configured to perform registration in order to align the data from various sensors spatially and/or temporally to provide accurate data fusion. The fusion module 264 may be configured to perform feature extraction to provide relevant features such as object positions, sizes, velocities, etc. The fusion module 264 may be configured to perform data association in order to identify common objects and/or track moving objects across multiple sensors. The fusion module 264 may be configured to perform estimation using various mathematical models (e.g., Kalman filters) to combine sensor measurements and/or estimate the state of objects and/or the environment. The types of operations performed by the fusion module 264 may be varied according to the design criteria of a particular implementation.

In some embodiments, the fusion module 264 may be an implementation of the sensor fusion module 190c described in association with FIG. 3. The fusion module 264 may be configured to receive the signal VDATA and the signal SDATA. The fusion module 264 may analyze and/or combine the data in the signal VDATA and/or the signal SDATA to make inferences and/or generate a feature-rich description of the environment 50. The feature-rich information about the environment 50 may be provided by a signal (e.g., FID). The signal FID may be presented to the intruder module 130.

The intruder module 130 may be configured to detect an event in response to the feature-rich information in the signal FID. The intruder module 130 may be configured to generate the signal EVT. The signal EVT may comprise a frame ID and/or frame numbers corresponding to the video data and/or sensor data of an event. The signal EVT may be presented to the AI module 270.

The intruder module 130 may be configured to detect particular types of information in the video data and/or sensor data. In an example, the intruder module 130 may comprise a detection threshold and/or a preliminary detection criteria. For example, the detection threshold and/or criteria may be a user defined value. The intruder module 130 may perform analysis on the video data and/or sensor data to determine whether a particular type of information in the video data and/or sensor data exceeds the detection threshold and/or meets the preliminary detection criteria. In one example, the intruder module 130 may implement the CNN module 190*b* to perform object and/or behavior detection. The intruder module 130 may determine the frame numbers and/or timestamps that correspond to video data and/or sensor data that has the particular type of information that exceeds the detection threshold and/or meets the preliminary detection criteria.

In one example, the intruder module 130 may implement motion detection. The detection threshold may be a motion threshold and the intruder module 130 may be configured to detect motion in the video data and/or sensor data. In another example, the intruder module 130 may implement object detection. The preliminary detection criteria may be a particular type of object (or objects) and the intruder module 130 may be configured to perform object detection in the video data. In yet another example, the intruder module 130 may implement facial detection. The preliminary detection criteria may be one or more pre-defined faces and the intruder module 130 may be configured to recognize faces in the video data. In still another example, the intruder module 130 may implement audio detection. The detection threshold may be a volume level and/or the detection criteria may be a particular type of audio signature (e.g., detecting particular types of sounds such as animal noises, broken glass, screams, etc.) and the intruder module 130 may be configured to analyze the audio captured with the video data. The type of detections performed by the intruder module 130 and/or the detection threshold used may be a user-defined preference and/or may be varied according to the design criteria of a particular implementation.

The intruder module 130 may be implemented to detect initial conditions for performing more advanced analysis of the video data and/or sensor data by the AI module 270. The meeting and/or exceeding of the detection threshold/criteria may be used as a trigger for performing an analysis by the AI module 270. For example, instead of performing video-to-text and/or sensor-to-text operations, classifying intruders, selecting countermeasures and/or generating records on all of the video data (and sensor data), the intruder module 130 may be used to detect ranges of time that are likely to have interesting and/or relevant information in the corresponding video/sensor data. In one example, the apparatus 100 may be operating in the environment 50 shown in association with FIG. 1 (e.g., an empty dock). Continually generating records describing the same scene (e.g., when no intruders are present) may not be beneficial and/or unnecessarily consume resources. The intruder module 130 may be configured to detect when the scene changes (e.g., a person and/or pest approaches the environment 50). In some embodiments, the intruder module 130 may monitor an area outside of the geo-fenced area 50 to detect intruders as they enter the geo-fenced area 50 (e.g., to ensure that the pest AI model 132 is active to record the event as soon as the intruder enters the geo-fenced area 50 to avoid missing the start of a potential event).

The intruder module 130 may be configured to extract the relevant sensor data that corresponds to the event. The relevant sensor data may be presented to the AI module 270. The relevant sensor data may comprise a subset of all of the sensor data acquired by the sensors 102*a*-102*n* that corresponds to a time range of the event determined by the intruder module 130. The intruder module 130 may provide timestamps, a range of timestamps, frame numbers and/or a range of frame numbers to the AI module 270. The intruder module 130 may provide the events comprising the pre-defined objects of interest, events of interest, motion, recognized faces, audio features, etc.

The AI module 270 may be configured to implement one or more AI models and/or AI modules. In some embodiments, the AI module 270 may be configured to implement a single AI model. For example, the single AI model may be configured to implement sensor-to-text analysis. The sensor-to-text analysis may generate a plain text (e.g., natural language that may be human readable) description of the content of the video frames and/or sensor data. The single AI model may be further configured to evaluate intruders and/or determine whether to deploy countermeasures. Generally, the AI module 270 may comprise hardware configured to implement DAGs and/or LLMs. The AI module 270 may comprise a block of hardware modules configured to perform complex AI operations (e.g., large matrix multiplication operations). The AI module 270 may be configured to perform natural text parsing, natural text generation and/or searching. In one example, the AI module 270 may implement an LLM AI model (e.g., a ChatGPT AI model, a Gemini AI model, a Claude AI model, Phi-3-mini, etc.). Details of LLM AI modules implemented may be described in U.S. patent application Ser. No. 18/210,931, filed on Jun. 16, 2023, appropriate portions of which are incorporated by reference. The number, and/or type of the AI models implemented by the AI module 270 may be varied according to the design criteria of a particular implementation.

In the example shown, the AI module 270 may implement multiple AI models. In the example shown, the AI module 270 may implement the pest AI model 132 and the efficacy AI model 134. The AI module 270 may be configured to generate the signal INT and/or the signal COM/DT in response to an analysis of the data in the signal EVT.

In some embodiments, the signal USR may enable the AI module 270 to receive and/or respond to user feedback. For example, the event records stored in the pest records 142 may be updated with feedback from the users. The efficacy AI model 134 may be configured to adapt not only to the natural text description of the environment 50 in the event records but also the user feedback stored in the event records. The user feedback may enable the efficacy AI model 134 to learn behavior and/or individualize the countermeasures selected. Some end users may have particular preferences. For example, an audio deterrence that successfully deters pests from a quiet, romantic restaurant may be distracting to the customers. In response to customer complaints about the audio deterrence, the restaurant owner may provide the signal USR with feedback about the countermeasure selected. The efficacy AI model 134 may evaluate a success and/or failure of countermeasures based on both a response of the pests 60*a*-60*c* and/or the user feedback. The efficacy AI model 134 may be capable of interpreting and/or parsing plain language. The feedback provided in the signal USR may comprise a plain language description of the user feedback (e.g., "customers complained that the audio deterrent was too loud"). The type of feedback that may be received and/or the response to the feedback by the efficacy AI model 134 may be varied according to the design criteria of a particular implementation.

Figure 5:
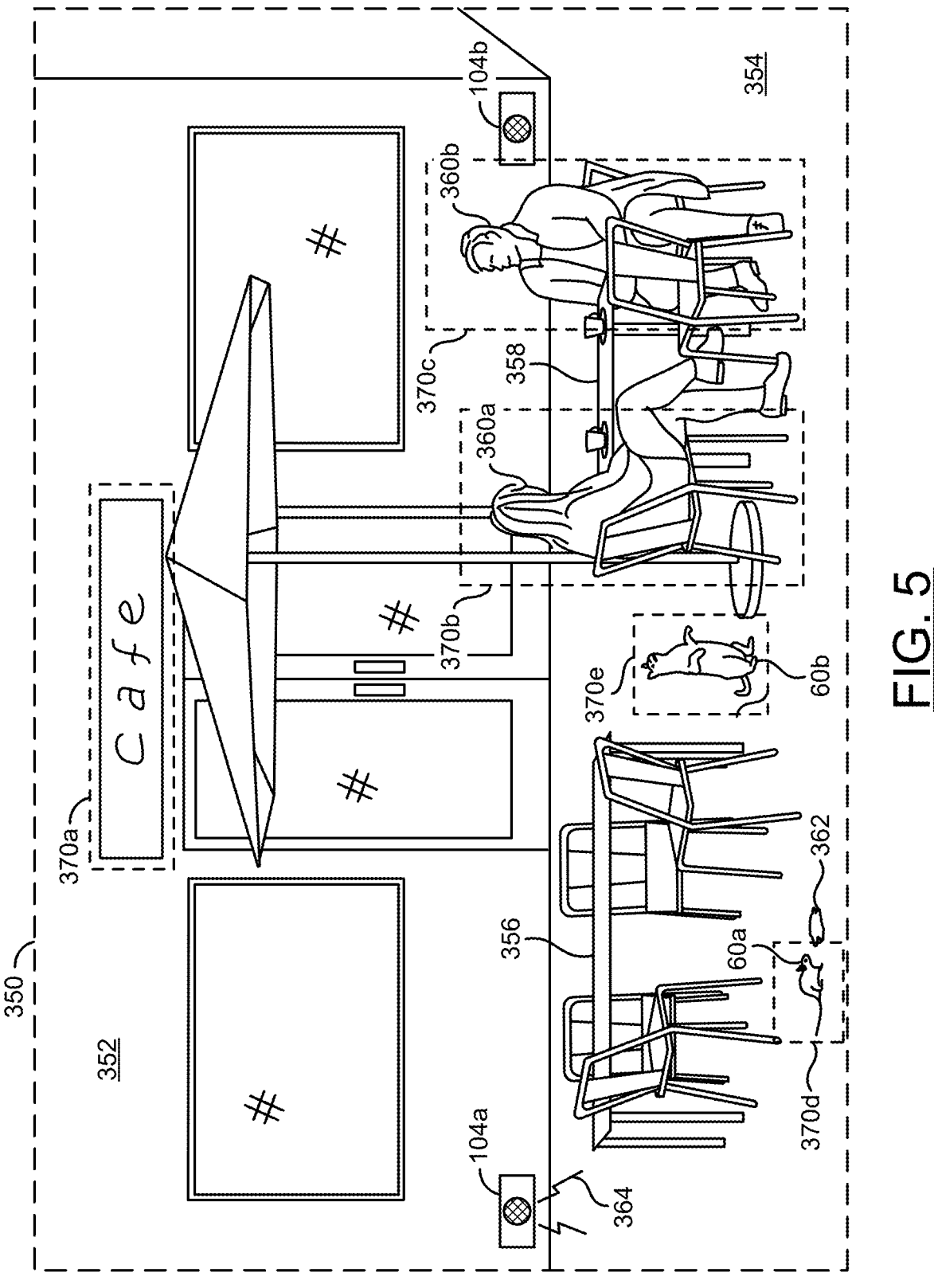
FIG. 5 is a diagram illustrating a pest deterrence scenario at a restaurant patio.

Referring to FIG. 5, a diagram illustrating a pest deterrence scenario at a restaurant patio is shown. An example pest deterrence analysis of a video frame 350 by the apparatus 100 is shown. Generally, the video frame 350 may be part of the sensor data provided to the pest AI model 132 in the signal EVT. The pest AI model 132 may be configured to perform video-to-text analysis of the video frame 350. The pest AI model 132 may be configured to analyze the video data (e.g., perform computer vision operations) to detect and/or respond to the pests and/or convert the video data to a natural text description and then analyze the text data to detect and/or respond to the pests. The text description and/or the video analysis may be performed locally by the pest AI model 132. In some embodiments, the pest AI model 132 may be offloaded to a scalable computing service. In the example pest deterrence analysis shown, the analysis may be determined based on the video frame 350. However, the pest deterrence analysis implemented by the apparatus 100 may be determined in response to multiple types of sensor data provided by the sensors 102a-102n.

The video frame 350 may be a representative example of the video data generated by the video processing pipeline 260 for analysis by the pest AI model 132. In one example, the video frame 350 may represent the video frames provided in the signal VDATA. In another example, the video frame 350 may represent a subset of the video frames in the signal EVT exacted by the intruder module 130. The video frame 350 may be provided as input to the pest AI model 132 for analysis. The video-to-text performed by the pest AI model 132 may generate the natural text descriptions of the environment 50 for the event records in response to the analysis of the video frame 350. In some embodiments, the video frame 350 may be stored in the memory 114. In some embodiments, the video frame 350 may be discarded after the pest AI model 132 generates the natural text description.

In one example, the video data (or visual content) of the video frame 350 is shown as a representative example of video data captured from the capture device 102n implemented by the apparatus 100. While the video frame 350 is shown as human viewable visual content for illustrative purposes, the pest AI model 132 may perform various operations on the pixel data and/or image blocks of the video frame 350. The video data of the video frame 350 may comprise the intruders 60a-60b, the deterrence devices 104a-104b, a restaurant 352, an outdoor patio 354, an empty table 356, an occupied table 358, patrons 360a-360b, and/or a food spill 362. An audio output 364 is shown for illustrative purposes (but would not be visible on the video frame 350).

Dotted shapes 370a-370e are shown in the video frame 350. The dotted shapes 370a-370e may represent the detection of an object/subject by the computer vision operations performed by the processor 112, the fusion module 264 and/or the pest AI model 132. The dotted shapes 370a-370e may comprise the pixel data corresponding to an object detected by the computer vision operations pipeline, the neural network model 190b and/or the pest AI model 132. In the example shown, the dotted shape 370a may correspond to a sign of the restaurant 352, the dotted shape 370b may correspond to the patron 360a, the dotted shape 370c may correspond to the patron 360b, the dotted shape 370d may correspond to the intruder 60a (e.g., a rat), and the dotted shape 370e may correspond to the intruder 60b (e.g., a cat). In some embodiments, the objects may be detected in response to animal detection, household object detection, interior object detection, person detection, vehicle detection, roadway detection, sky region detection, obstacle detection and/or exterior object detection (e.g., one or more of the neural network 190b and/or the pest AI model 132 may comprise libraries configured to detect people, vehicles, objects, animals, etc.). The dotted shapes 370a-370e are shown for illustrative purposes. In an example, the dotted shapes 370a-370e may be visual representations of the object detection (e.g., the dotted shapes 370a-370e may not appear on an output video frame in the signal VIDOUT). In another example, the dotted shapes 370a-370e may be bounding boxes generated by the processor 112 displayed on the output video frames to indicate that an object has been detected (e.g., the dotted shapes 370a-370e may be displayed in a debug mode of operation).

The computer vision operations and/or the video-to-text operations may be configured to detect characteristics of the detected objects, behavior of the objects detected, a movement direction of the objects detected, a context of the objects detected and/or a liveness of the objects detected. The characteristics of the objects may comprise a height, length, width, slope, an arc length, a color, a color temperature, an amount of light emitted, detected text on the object, a path of movement, a speed of movement, a direction of movement, a proximity to other objects, etc. The characteristics of the detected object may comprise a status of the object (e.g., opened, closed, on, off, etc.). The characteristics of the detected object may comprise a distance measurement from the lens 160 to the detected object. The behavior and/or liveness may be determined in response to the type of object and/or the characteristics of the objects detected. While one example video frame 350 is shown, the behavior, movement direction and/or liveness of an object may be determined by analyzing a sequence of video frames captured over time. For example, a path of movement and/or speed of movement characteristic may be used to determine that an object classified as a person may be walking or running. The types of characteristics and/or behaviors detected may be varied according to the design criteria of a particular implementation.

In the example shown, the bounding boxes 370a-370e may be regions of interest of a subset of the objects in the video frame 350. The bounding boxes 370a-370e are shown as representative examples of various objects but, generally, many more objects may be detected (e.g., buildings, plants, animals, people, etc.). In an example, the settings (e.g., the feature set) for the processor 112 (e.g., the computer vision AI neural network model implemented by the CNN module 190b), the intruder module 130 and/or the pest AI model 132 may define objects of interest to be pets, people, signs, dining utensils, tools, vehicles, etc. In the example shown, the bounding boxes 370a-370e are shown having a cubic (or rectangular) shape. In some embodiments, the shape of the bounding boxes 370a-370e that correspond to the objects of interest detected may be formed to follow the shape of the body of the people detected and/or the shape of the various objects detected (e.g., an irregular shape that follows the curves and/or the body shape of the detected objects).

The processor 112, the CNN module 190b, the pest AI model 132 and/or the intruder module 130 may be configured to implement region, animal, object and/or face detection techniques. In some embodiments, other types of subjects as objects of interest may be detected (e.g., vehicles, traffic lights, street signs, etc.). The computer vision techniques and/or the video-to-text techniques may be configured to detect the regions of interest (ROIs) of the detected objects 370a-370e and/or generate the information about the detected objects 370a-370e and/or the context of the scene generally. For example, the bounding boxes 370a-370e may be a visual representation of the ROIs detected. The computer vision technique may be looped (e.g., to iteratively perform object/subject detection throughout the example video frame 350) in order to determine if any objects of interest (e.g., as defined by the feature set) are within the field of view of the lens 160 and/or the image sensor 180.

While only the objects 370a-370e are shown as objects of interest, the computer vision operations, the video-to-text operations and/or the sensor-to-text performed by the processor 112, the CNN module 190b, the pest AI model 132 and/or the intruder module 130 may be configured to detect background objects and/or other types of objects. The background objects may be detected for other computer vision purposes (e.g., training data, labeling, depth detection, etc.) and/or for details for the natural text description. The type(s) of subjects identified as the objects of interest 370a-370e may be varied according to the design criteria of a particular implementation.

The pest AI model 132 may analyze the video frame 350 to generate the natural text description that may describe the contents of the video data. The pest AI model 132 may analyze the video frame 350 to determine whether any intruders detected may be classified as pests (e.g., to generate an event record and/or activate the deterrent devices 104a-104b). In some embodiments, the pest detection and/or classification may be performed in parallel with the video-to-text operations. In some embodiments, the pest detection and/or classification may be performed after the video-to-text operations on the natural text description generated about the video frame 350.

The pest AI model 132 may be configured to identify the intruders and/or classify the intruders detected. In the example shown, the rat 60a, the cat 60b and/or the patrons 360a-360b may be potential intruders. In some embodiments, the pest AI model 132 may operate according to some constraints. In one example, the constraints may be received according to the signal USR. For example, the owner of the restaurant 352 may install the apparatus 100 and provide some constraints (e.g., to indicate that people detected during business hours are not pests, that the servers are not pests, that delivery people are not pests, etc.). In another example, the apparatus 100 may be implemented with some initial training (e.g., the pest AI model 132 may comprise pre-installed initial constraints for particular businesses and/ or use contexts).

In the example context shown, the pest AI model 132 may detect the object 370a, which may provide context for the environment 50 (e.g., the sign may indicate a restaurant environment). The pest AI model 132 may detect the objects 370b-370c as patrons of the restaurant 352 (e.g., sitting at a table, eating food, indicating behavior expected of a customer, etc.). In some embodiments, the classifying the detected objects 370b-370c as people may be sufficient to determine the patrons 360a-360b may not be classified as pests. In some embodiments, even if an intruder is determined to be a person, the person may be classified as a pest (e.g., a loiterer, a panhandler, a criminal, etc.). Other factors may be analyzed (e.g., a face of a known criminal may be determined using facial recognition to determine that a person is a pest). In another example, a person may be considered a pest based on an analysis of a sequence of video frames (e.g., a person detected standing near the restaurant 352 may be considered a loiterer if detected for more than 5 minutes). Whether people may be considered as one of the pests may be varied according to the design criteria of a particular implementation.

The pest AI model 132 may determine the detected object 370d is a rat and the detected object 370e is a cat. The pest AI model 132 may further analyze the behavior of the intruders 60a-60b. The rat 60a is shown eating the spilled food 362. The cat 60b is shown begging at the table 358. In one example, both the rat 60a and the cat 60b may be classified as a pest. In another example, the cat 60b may not be considered a pest (e.g., the restaurant 352 may be a cat café where the animals are an attraction for the guests). For example, the cat 60b may initially be detected as a pest and, through feedback (either from the user input USR or detecting the behavior of the patrons 360a-360b such as petting the cat 60b and/or feeding the cat 60b) the cat 60b may be re-classified as not a pest. In some embodiments, the pest database 144 may comprise details of which animals may be classified as pests and which individual animals (or particular animals, for example one cat may be welcome and another cat may be a pest) may be classified as pests may be stored in the pest database 144. For example, the pest database 144 may store details (e.g., fur patterns, names, distinct features, etc.) of individual animals. In some embodiments, particular an animal may not be considered a pest until particular behavior is detected. For example, the cat 60b may not be classified as a pest until the begging behavior is detected. Which animals and/or behavior of animals may be classified as pests may be varied according to the design criteria of a particular implementation.

In response to detecting the pest 60a, the pest AI model 132 may determine which countermeasures may be effective against the particular pest. For example, the pest AI model 132 may access the action list 140 comprising information about how a rat may be deterred. In some embodiments, the action list 140 may comprise a recommended countermeasure. The pest AI model 132 may further modify the recommended countermeasure based on the context detected in the environment 50. For example, generating noise may be one method of chasing away the rat 60a. The pest AI model 132 may not access the action list 140 for each pest detection. For example, the pest AI model 132 may learn which countermeasures are effective for a particular pest and then adapt the countermeasures based on learned experience. In one example, the pest AI model 132 may generate the signal COM/DT to activate the deterrent devices 104a-104b. Jagged lines 364 are shown indicating audio playback by the deterrent device 104a implementing a speaker.

In one example, the pest AI model 132 may activate both the speaker deterrent devices 104a-104b, which may successfully chase away the rat 60a. However, activating both speakers may cause annoyance to the patrons 360a-360b. The efficacy AI model 134 may analyze the outcome and determine that the countermeasure of playing sound from both the speakers 104a-104b may not be a suitable response. The efficacy AI model 134 may adapt the countermeasure to playing audio from speakers only when patrons are not sitting near a speaker. In the example shown, the efficacy AI model 134 may update the pest AI model 132 to perform the countermeasure to play the audio output 364 from only the speaker 104a (e.g., close to the rat 60a but not near the table 358 with the patrons 360a-360b while the speaker deterrent device 104b is not active). The efficacy AI model 134 may continue to analyze the efficacy to determine that the updated countermeasure still successfully deters the rat 60a while not disturbing the patrons 360a-360b.

Continuing the example, playing the audio output 364 from only the speaker deterrent device 104a may not disturb the patrons 360a-360b, but may chase away the cat 60b (e.g., classified as a desired animal). For example, the efficacy AI model 134 may learn that the cat 60b and the rat 60a may both be deterred by a particular frequency and/or sound signature. The efficacy AI model 134 may then update the pest AI model 132 to generate the audio output 364 using a frequency and/or sound signature that does chase away the rat 60*a*, but does not disturb the cat 60*b*. In another example, the cat 60*b* may be classified as a desired animal, but the begging behavior of the cat 60*b* may be considered pest behavior. For example, no countermeasure may be selected for the cat 60*b*, but when the begging behavior is detected a countermeasure may be selected to deter the particular undesired behavior of the cat 60*b* (e.g., a drone or ground bot may be deployed equipped with water to spray the cat 60*b* so that the cat 60*b* does not run away, but the cat 60*b* learns the begging behavior is bad behavior).

The pest AI model 132 may select various countermeasures based on the context of the environment 50. In one example, when the patrons 360*a*-360*b* are present, the countermeasure may be selected not to disturb the patrons 360*a*-360*b*. For example, if a dog barking is determined to be pest behavior, the countermeasure may be to generate an audio frequency outside of human hearing range (e.g., a dog whistle) when people are present to stop the dog from barking. In another example, when no patrons are detected (e.g., after business hours) other countermeasures may be selected (e.g., an odor may be emitted that repels the rat 60*a*). In yet another example, after business hours, but late at night, audio may be in violation of city noise regulations, and another countermeasure may be selected. The countermeasure selected may be determined partially by the time of day the pests have been detected.

The pest AI model 132 may be configured to generate the event record for the video frame 350. In some embodiments, the event record may be initialized based on a description of the video frame 350 before a countermeasure is selected, the countermeasure may be selected based on an analysis of the text description (and the video frame may be discarded to reduce storage requirements), and then the event record may be updated after the outcome of the countermeasure is determined. While a single example video frame 350 is shown representative of the event, generally the natural text description may comprise a description for each of the video frames and/or a group (or sequence) of video frames that comprise the event.

The event records stored in the pest records 142 may be generated by the pest AI model 132. The event records may correspond to a fusion of the sequence of video frames and/or other sensor data used to analyze the environment 50 during the event. The event records may comprise sensor information. For example, the event record may describe the camera ID and/or sensor ID of the sensors 102*a*-102*n* that captured the event (e.g., if a subset of the sensors 102*a*-102*n* captured the event while others did not). In an example, a camera ID number/label may be used to identify the capture device 102*n* that captured the event. The event records may comprise timestamp information indicating when the event started, when the event ended and/or the length of the event (e.g., the event started at 1 p.m. and lasted for 2 minutes). In some embodiments, the event records may store frame ID information for the sensors 102*a*-102*n* (e.g., for scenarios where all of the sensor data is stored to correlate the text description to the sensor data).

The event record may comprise a natural language text description of the event. In the example shown, the event description may be "Two people, a man and a woman, are eating at a table outside in front of a restaurant. The time is 5:36 p.m. on a clear, sunny day on May 4, 2024. The doors and windows of the restaurant are closed. The two people are sitting under an umbrella. The table next to the two people is empty. Food has spilled on the ground next to the empty table. A rat is eating the spilled food. A cat is begging next to one of the people eating". After the pest AI model 132 classifies the animals as pests or not, the event description may be updated, such as "The rat has been classified as a pest. The cat is named Bob and is known to the owner of the restaurant. The cat is not a pest". After the pest AI model 132 selects the countermeasure, the event description may be updated to describe the outcome, such as "To deter the rat, a countermeasure was deployed from nearby speakers. The audio selected was played from the speaker near the rat, but not the speaker near the two people. After 30 seconds of playing the audio, the rat left the area. Bob the cat was not disturbed by the audio. The two people did not react to the audio. The countermeasure was successful". The natural text described may be an example. The natural text description for the event record may comprise a different style of language. In one example, the natural description may be artful. In another example, the natural description may be utilitarian language. The style of the natural text description may be varied according to the design criteria of a particular implementation.

The description for the event records may be generated in response to the outcome analysis performed by the AI module 270. For example, the description may describe the video contents and/or other sensor data with sufficient detail that the source video frame 350 may no longer be necessary to understand the video contents. For example, the description may provide a human readable description of the contents of the video frame 350 with sufficient detail to enable the visually impaired to understand the contents of the video frames (e.g., using a screen reader). The description may further comprise content acquired from the sensors 102*a*-102*n* that do not provide video content. Further details may be provided. For example, the description may describe the person 360*a* (e.g., what the person is wearing, where the person is looking, what the person is doing with her hands, whether the person is touching the cat 60*b*, how long person has been sitting at the table 358, the behavior of the person, etc.). In various scenarios other data may be provided from the sensors 102*a*-102*b* (e.g., additional details received from thermal data may provide the temperature of the environment 50). The level of detail and/or the granularity of the description may be adjustable. The amount of text, the type of description and/or the information stored as the event record may be varied according to the design criteria of a particular implementation.

The efficacy AI model 134 may be configured to analyze the event records stored in the pest records 142. For example, the rat 60*a* may adapt to particular deterrents. Animals tend to adapt to fixed deterrents. For example, the audio output 364 may be updated (or regularly rotated) to different types of bird noises (e.g., predator bird screeches) to vary and/or adapt the countermeasures applied. In another example, an alternate countermeasure may be selected (e.g., a ground bot that may perform an aggressive posture to the rat 60*a*).

Figure 6:
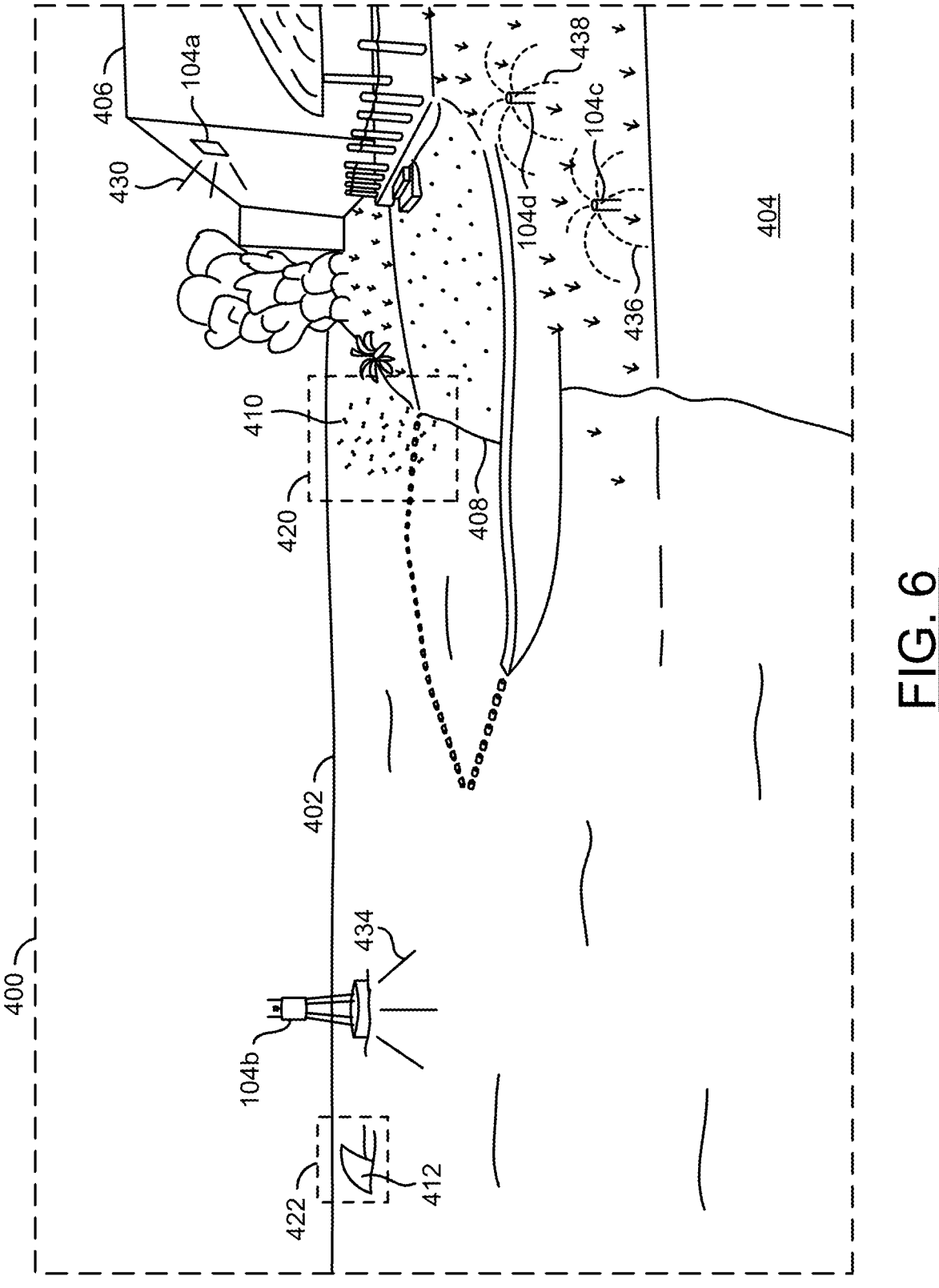
FIG. 6 is a diagram illustrating a pest deterrence scenario at a waterfront.

Referring to FIG. 6, a diagram illustrating a pest deterrence scenario at a waterfront is shown. An example video frame 400 is shown. The example video frame 400 may be a representative example of the sensor data generated by the sensors 102*a*-102*n*. The video frame 400 of the waterfront may undergo a similar analysis (e.g., video to text analysis, pest analysis, countermeasure efficacy analysis, etc.) as the video frames described in association with FIG. 5.

The video frame 400 may comprise a view of water 402, waterfront property 404, a beachfront property 406 and/or a beach area 408. The intruder module 130 may detect a potential event in response to detecting potential intruders. In the example video frame 400, the potential intruders 410-412 are shown. The intruder 410 may be a swarm of bugs. The intruder 412 may be a shark fin. The processor 112 may perform computer vision operations on the video frame 400 to detect objects. Detected objects 420-422 are shown. The detected object 420 may correspond to the bug swarm 410 on the beach area 408. The detected object 422 may correspond to the shark fin 412 in the water 402. The pest AI model 132 may generate a text description of the event. In an example, the text description may be, "On a warm summer morning the water is calm near the beach front property. No people are on the beach. A swarm of bugs is flying on the beachfront, which will be annoying to anybody that arrives. A fin is in the water in the distance. The fin is beyond the beach markers. The fin might belong to a shark. The shark could be a danger to swimmers."

The environment 50 may comprise deterrence devices 104a-104d. The deterrence device 104a may be a fixed device (e.g., unable to move). The deterrence device 104a may be a light source configured to generate a light pattern 430 as a countermeasure. The deterrence device 104b may be a water-based deterrent device. The deterrence device 104b may be a buoy configured to generate an electrical field 434. The deterrence devices 104c-104d may be fixed devices. The deterrence devices 104c-104d may each implement a sprinkler (e.g., part of an in-ground sprinkler system) configured to generate the sprayed water 436-438, respectively. The action list 140 may indicate which countermeasures are available to the pest AI model 132 in the environment 50.

The pest AI model 132 may analyze the context of the environment 50 along with the available countermeasures. For example, operating the electric field 434 may be expensive and/or potentially dangerous. Weather may be one type of contextual information. For example, if the environment 50 in the video frame 400 is rainy weather and nobody is swimming in the water 402, the pest AI model 132 may determine that no countermeasure deployment may be beneficial to deter the shark 412 (e.g., the shark may leave on its own and causes no danger when no people are present and costs may be saved by not activating the electric field 434). Time of day and/or lighting conditions may be one type of contextual information. For example, during the day, activating the light pattern 430 may not be effective to draw the bug swarm 410 away from the beach front 408. The type of pest may be another type of contextual information. Generally, non-lethal countermeasures may be deployed. However, for bugs, lethal countermeasures (e.g., the light pattern 430 may be from a bug zapper that may kill the bugs in the bug swarm 410) may be acceptable. The presence of people may be another type of contextual information. For example, if people are detected on the property 404, then the sprayed water 436-438 may not be deployed (e.g., the sprayed water 436-438 may be a nuisance for the people). In some embodiments, one or more of the deterrence devices 104a-104d may be multi-purpose devices. For example, the in-ground sprinklers 104c-104d may be used as a deterrence for pests (e.g., pests that do not like being sprayed with water, such as a cat). However, the in-ground sprinklers 104c-104d may have an alternate purpose (e.g., watering a lawn and/or plants). In an example, the in-ground sprinklers 104c-104d may be enabled/disabled manually by a person, may be scheduled (e.g., to water the lawn at particular times of the day/week) and may be further enabled/disabled by the apparatus 100 as a countermeasure in response to a detected pest (e.g., enabled off-schedule).

In one example, the pest AI model 132 may describe the selection of the countermeasures, which may justify not deploying any countermeasures. For example, the text description may be, "The lights would not be effective against the bug swarm during the day. No available countermeasures would be effective. Generating wind might deter bugs in the future. Recommend installing a fan system near the beach. Since the weather is raining and nobody is attempting to enter the water, no deterrence has been deployed for the shark. Based on prior detections of sharks, sharks do not remain in this area for long. Recommendation to not deploy countermeasure will be adjusted if people attempt to enter the water." The efficacy AI model 134 may analyze the event record and any potential event records received later (e.g., to determine if the shark went away on its own). The efficacy AI model 134 may provide adjustments to the pest AI model 132 based on the outcome detected by analyzing the pest records 142.

The apparatus 100 is shown on a beach front property as a representative example. The apparatus 100 may be implemented in various scenarios. For example, the apparatus 100 may be implemented at an airport. Ground based bots and/or aerial drones may be implemented as deterrent devices to chase birds out of the area of an airport (e.g., to prevent birds from causing issues with airplanes). The locations and/or deterrence methods implemented for each location may be varied according to the design criteria of a particular implementation.

Referring to FIG. 7, a block diagram illustrating remote updates for countermeasures and conversational AI for event records is shown. A block diagram 450 is shown. The block diagram 450 may be a communication system. Portions of the apparatus 100 are shown in the communication system 450.

The communication system 450 may comprise the processor 112, the memory 114, the user device 242, a block (or circuit) 452, a block (or circuit) 454 and/or a block 456. The circuit 452 may implement a remote computing device. The block 454 may be an event record. The block 456 may comprise a conversational interface.

The remote computing device 452 may comprise a block (or circuit) 460, a block (or circuit) 462, a block (or circuit) 464, a block (or circuit) 466 and/or a block (or circuit) 468. The circuit 460 may implement a central processing unit (CPU). The circuit 462 may implement a memory. The circuit 464 may implement a source action list. The circuit 466 may implement source pest records. The circuit 468 may implement a source pest database. The remote computing device 452 may comprise other components (not shown). The number, type and/or arrangement of the components of the remote computing device 452 may be varied according to the design criteria of a particular implementation.

The remote computing device 452 may be a device separate from the apparatus 100. In one example, the remote computing device 452 may be on the same local area network as the apparatus 100. In another example, the apparatus 100 may communicate with the remote computing device 452 over the internet and/or another wide area network. For illustrative purposes, the remote computing device 452 is shown as a single device. However, the remote computing device 452 may comprise a number of computing devices.

In some embodiments, the remote computing device 452 may be a scalable computing service. In an example, the scalable computing service implemented by the remote computing device 452 may be implemented as a group of cloud-based, scalable server computers. By implementing a number of scalable servers, additional resources (e.g., power, processing capability, memory, etc.) may be available to process and/or store variable amounts of data. For example, the scalable computing service implementing the remote computing device 452 may be configured to scale (e.g., provision resources) based on demand. The scalable computing services implementing the remote computing device 452 may implement scalable computing (e.g., cloud computing). The scalable computing may be available as a service to allow access to processing and/or storage resources without having to build infrastructure (e.g., the provider of the apparatus 100 may not have to build the infrastructure of the scalable computing service).

The CPU 460 may be a processor configured to execute computer executable instructions. The memory 462 may be configured to store data and/or computer executable instructions. In some embodiments, the CPU 460 may be a general purpose processor circuit. In some embodiments, the CPU 460 may comprise or have access to a graphics processing unit (GPU). For example, the CPU 460 may be a combined graphics processing unit and/or general processing unit. The graphics processing unit may be implemented to efficiently perform image and/or video processing calculations. The CPU 460 may be operational to interact with the memory 462 to perform various processing tasks. In one example, computer executable instructions may be stored by the memory 462. In one example, the CPU 460 may implement a 32-bit instruction set (e.g., x86). In another example, the CPU 460 may implement a 64-bit instruction set (e.g., AMD64). In yet another example, the CPU 460 may implement an ARM instruction set. In still another example, the CPU 460 may implement a RISC-V instruction set. The architecture and/or the computer readable instructions implemented by the CPU 460 may be varied according to the design criteria or a particular implementation.

The memory 462 may store data. The memory 462 may implement various types of memory including, but not limited to, a cache, flash memory, a memory card, random access memory (RAM), dynamic RAM (DRAM) memory, etc. The type and/or size of the memory 462 may be varied according to the design criteria of a particular implementation. The memory 462 may be accessed by the CPU 460. The memory 462 may store an operating system (OS) and programs/applications (e.g., apps, a dashboard interface, etc.). The apps may operate on various operating system platforms (e.g., Windows, iOS, Linux, Android, Windows Phone, macOS, Chromium OS/Chrome OS, Fuchsia, Blackberry, etc.). In some embodiments, the memory 462 may provide the memory 114 for the apparatus 100.

The source action list 464 may comprise a list of deterrent options, similar to the action list 140 implemented by the memory 114. The source action list 464 may comprise a list of deterrent options. The deterrent options in the source action list 464 may comprise any available countermeasure, regardless of the available deterrent devices 104. For example, the source action list 464 may provide countermeasures that may be used against pests in any location. Countermeasure data from the source action list 464 may be accessed by the apparatus 100 and the pest AI model 132 and/or the efficacy AI model 134 may be configured to determine which of the countermeasures may be implemented and/or may be effective locally.

The source pest records 466 may comprise event records uploaded from multiple different implementations of the apparatus 100. The source event records 466 may comprise the natural text description of events that occurred in various locations for various types of pests. In some embodiments, the CPU 460 and/or the memory 462 may be configured to implement one or more AI models that perform functionality similar to the efficacy AI model 134. The AI models implemented by the remote computing device 452 may be configured to analyze common events to determine which countermeasures may be effective against different pests based on countermeasures performed at various locations around the world. For example, the source pest records 466 may be used to generate additional countermeasures for the source action list 464.

The source pest database 468 may comprise information about the pests. Different locations around the world may deal with different types of pests, and there may be no benefit for the pest records 142 implemented by the apparatus 100 to have data for all pests. The source pest database 468 may comprise a text description of the pests similar to the pest database 144. The source pest database 468 may further comprise images of various pests, sounds made by pests, size and shape information, behavioral information, known responses to particular countermeasures, etc. For example, for the source pest database 468, the number of pests may not be limited based on a particular region. When the apparatus 100 is unable to determine recognize a new pest, the apparatus 100 may access the remote computing device 452 to receive updated information about pests. For example, due to the effects of climate change, species of pests that were once non-native to a region may begin to move to a new region. The source pest database 468 may enable the apparatus 100 to receive new information about previously unknown types of pests.

The remote computing device 452 may receive a signal (e.g., UPD_R) and/or a signal (e.g., UPD_L). The remote device 452 may generate a signal ACT_UPD. The signal UPD_R may be received from other implementations of the apparatus 100. For example, various implementations of the apparatus 100 may be implemented throughout the world, and each may be configured to generate the signal UPD_R. The signal UPD_L is shown provided by the processor 112. For example, the signal UPD_L may be communicated by the apparatus 100 via the communication device 116. The signal UPD_L may provide similar data as the signal UPD_R. For example, the signal UPD_L may represent data generated by the apparatus 100 (e.g., a local implementation) and the signal UPD_R may represent data updated by other (e.g., remote) implementations of the apparatus 100. The signal UPD_R/UPD_L may comprise information updates provided by the apparatus 100. The data in the signal UPD_R/UPD_L may comprise information about the types and/or efficacy of various countermeasures and/or information about various types of pests. The data in the signal UPD_R/UPD_L may be used to provide data for the source action list 464, the source pest records 466 and/or the source pest database 468.

The signal ACT_UPD may be presented to the apparatus 100. The signal ACT_UPD may comprise information about different types of countermeasures to add to the action list 140 and/or different types of pests to add to the pest database 144. For example, the communication device 116 may be connected to the internet to enable the apparatus 100 to access entirely new countermeasures that may be added over time (e.g., over-the-air updates). In some embodiments, the apparatus 100 may generate a request each time an unknown pest is detected and/or when various countermeasures become ineffective (e.g., along with event records). In response to the request, the remote computing device 452 may generate the signal ACT_UPD to provide new countermeasures and/or information about the new pests to the apparatus 100. The pest AI model 132 may learn from the local pest records 142 how to apply the new countermeasures (e.g., since animal behavior may be specific to a local population that may have experienced the various countermeasures and may have already adapted to some countermeasures). The processor 112 may present the signal ACT_UPD to the memory 114 to update the action list 140 and/or the pest database 144.

The event record 454 may be one of the event records stored by the pest records 142. The event record 454 may comprise a number of datapoints 470a-470n. The datapoints 470a-470n may comprise a number of prerequisite information for the pest AI model 132 to generate for the event record 454. The datapoints 470a-470n may be part of the natural text of the event generated by the pest AI model 132. For example, how the datapoints 470a-470n are incorporated into the natural text description for the event record 454 may be determined by the pest AI model 132 based on local dialects, particular sentence structures generated, grammatical rules, the data from the sensors 102a-102n and/or the particular scenario detected.

The datapoint 470a may be sensor IDs. The sensor IDs 470a may comprise information about the particular sensors 102a-102n that provided the data for the particular event. For example, not all of the sensors 102a-102n may provide data for a particular event. The sensor IDs 470a may comprise a unique identifier, a sensor type and/or operational data for the sensors 102a-102n. The datapoint 470b may be a pest type. The pest type 470b may comprise the classification performed by the pest AI model 132 (e.g., a goose, a raccoon, a rat, etc. selected from the pest database 144). The pest type 470b may further comprise the basis for making the classification (e.g., fur color, feather colors, size, shape, sounds, behavior, etc.). The datapoint 470c may be a description. The description 470c may comprise the natural text description of the event and/or location. For example, the LLM that implements the pest AI model 132 may generate human-readable sentences that describe the environment 50.

The datapoint 470d may be a response. The response 470d may comprise the countermeasure selected from the action list 140. The response 470d may comprise how long the countermeasure was applied for, data about particular attributes of the countermeasure (e.g., audio frequency selected) and/or a rationale for selecting the countermeasure. The datapoint 470e may comprise a status. The status 470e may indicate a success or failure of the selected countermeasure to deter the pest. The status 470e may make a binary classification (e.g., success or failure). The status 470e may provide further information about the result of the countermeasure (e.g., how long before the pest left, whether the pest reacted at all, a change in amount of time that the pest took to leave compared to a previous event, etc.). The datapoint 470n may comprise other data. The other data 470n may comprise any data that may be relevant to the event. For example, the other data 470n may indicate whether the pest survived the countermeasure. In another example, the other data 470n may comprise frame ID data that may indicate which video frames and/or sensor data stored in the memory 114 corresponds to the particular event (e.g., as indicated in the signal EVT). The particular datapoints 470a-470n included and/or the amount of information in each of the event records 454 may be varied according to the design criteria of a particular implementation.

The LLM that implements the efficacy AI model 134 may enable a conversational interface for the end user. For example, the end user may use the companion app 244 on the user device 242 to query the apparatus 100 about the pest records 142 and/or other information (e.g., available countermeasures, whether countermeasures that use consumables need to be refilled, whether new countermeasures should be added, etc.). The user device 242 may generate a signal (e.g., QUERY). The efficacy AI model 134 may generate a signal (e.g., RESULT) in response to the signal QUERY. The signal QUERY may comprise a natural text input from the end user. For example, the signal QUERY may comprise a question provided by the end user (e.g., "Does the bear spray need to be refilled?"). The question provided in the signal query may not need to include particular keywords. The LLM implementing the efficacy AI model 134 may be configured to parse the question and generate a response. The LLM implementing the efficacy AI model 134 may be configured to perform natural text parsing, natural text generation and/or natural text searching. For example, the LLM AI implementing the efficacy AI model 134 may translate the natural language input into computer readable information without restricting the user input to particular keywords and/or input formats. The LLM AI implementing the efficacy AI model 134 may be configured to analyze each word input in the signal QUERY individually and/or together based on the order, arrangement and/or context of the input provided. The signal RESULT may comprise an answer to the query. The signal RESULT may comprise a natural text response that may be prompted by the question in the signal QUERY. For example, in response to the question about the bear spray the efficacy AI model 134 may generate a response (e.g., "There is enough bear spray for another two months."). The signal RESULT may be received by the user device 242 and the natural language of the response by the efficacy AI model 134 may be displayed on the companion app 244. The signal QUERY and the signal RESULT may be repeatedly exchanged between the user device 242 and the efficacy AI model 134 to enable a conversational dialog exchange.

The conversational interface 456 is shown as an example of a conversational dialog exchange between an end user and the efficacy AI model 134. For example, the conversational interface 456 may be displayed on the user device 242 using the companion app 244. User questions 480a-480c are shown. The user questions 480a-480c may represent natural text input by the end user and sent to the efficacy AI model 134 via the signal QUERY. Natural language responses 482a-482c are shown. The natural language responses 482a-482c may represent natural text output by the efficacy AI model 134 in response to the user questions 480a-480c.

In the example shown, the end user may submit a user question 480a. The user question 480a may be "When was the last time geese were chased away?". The efficacy AI model 134 may parse the question and then analyze the pest records 142 to respond to the question (e.g., search for the latest record where the goose was successfully deterred). The efficacy AI model 134 may form the natural language response 482a based on the question 480a and the data received from the event records. In the example shown, the natural language response 482a may be, "The last time geese were detected was on Apr. 20, 2024 at 8:33 AM. I deployed drones to chase the geese away. The geese left the area at 8:36 AM, resulting in a 3 minute result time.".

In the example shown, the end user may submit the user question 480b. The user question 480b may be, "How effective have the drones been?". The efficacy AI model 134 may parse the user question 480b, in the context of the previous user question 480a. For example, the efficacy AI model 134 may use the context of the previous question about geese to determine that the question about drones applies to geese. The efficacy AI model 134 may analyze the pest records 142 for all event records of geese where drones were used and determine the efficacy over time to generate the natural language response 482*b*. In the example shown, the natural language response 482*b* may be, "I started using drones three weeks ago. The response time to chase geese away has been about three minutes each time. I have not detected any decrease in efficacy for drones".

Similarly, the conversational back-and-forth may continue. In the example shown, the user may submit the user question 480*c* that states, "What was the last countermeasure used?". The efficacy AI model 134 may use the context of the previous questions as a prompt to search the event records to formulate the natural language response 482*c*. In the example shown, the natural language response 482*c* may be, "Up until three weeks ago, I used audio at ultrasonic frequencies. The efficacy of audio started to drop, so I changed to drones." The particular dialog generated in response to the user questions 480*a*-480*c* may depend on the available information in the event records, the type of language input by the end user and/or the design criteria of a particular implementation.

Figure 8:
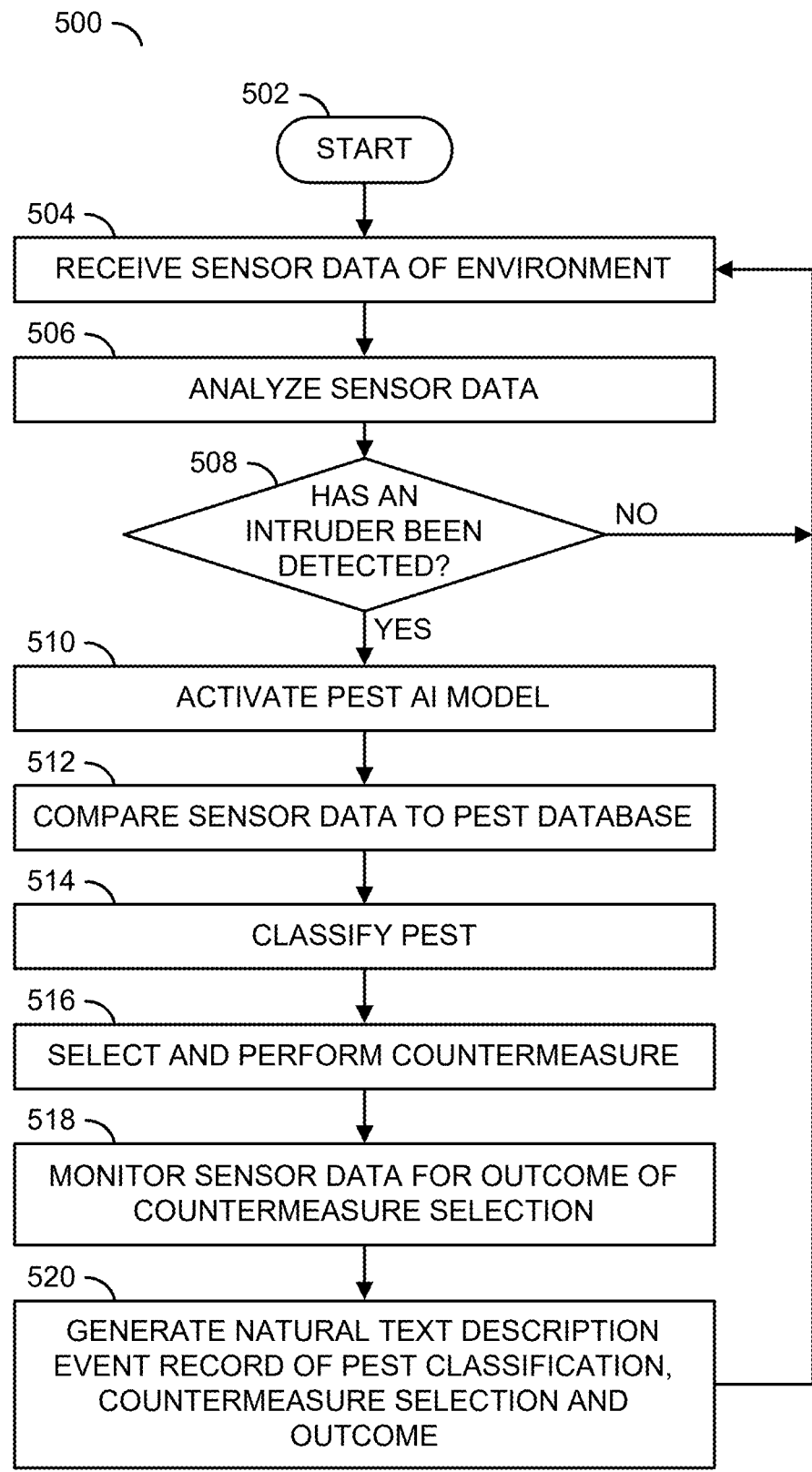
FIG. 8 is a flow diagram illustrating a method for implementing an auto-adapting pest deterrent system.

Referring to FIG. 8, a method (or process) 500 is shown. The method 500 may implement an auto-adapting pest deterrent system. The method 500 generally comprises a step (or state) 502, a step (or state) 504, a step (or state) 506, a decision step (or state) 508, a step (or state) 510, a step (or state) 512, a step (or state) 514, a step (or state) 516, a step (or state) 518, and a step (or state) 520.

The step 502 may start the method 500. In the step 504, the interface 110*a*-110*b* may receive the sensor data of the environment 50. In an example, one or more of the sensors 102*a*-102*n* may present the respective sensor data signals SD_A-SD_N to the interface 110*a*-110*b*. The interface 110*a*-110*b* may present the signal IN to the processor 112 comprising the sensor data. Next, in the step 506, the processor 112 may analyze the sensor data. For example, the intruder module 130 may analyze the sensor data, while the pest AI model 132 is in a sleep state. Next, the method 500 may move to the decision step 508.

In the decision step 508, the processor 112 may determine whether an intruder has been detected. For example, the intruder module 130 may analyze the sensor data in the signal IN. The intruder module 130 may determine whether the intruder corresponds to an event (e.g., based on threshold information, such as movement and/or computer vision operations). If an intruder has not been detected, then the method 500 may return to the step 504 to continue to monitor the environment 50 (e.g., no event detected). If an intruder has been detected, then the method 500 may move to the step 510 (e.g., to analyze the event). While the steps 510-520 are shown separate from the steps 504-506, even when an event has been detected, the processor 112 may continue to monitor the environment 50 using the sensors 102*a*-102*n*.

In the step 510, the processor 112 may activate the pest AI model 132. For example, the intruder module 130 may generate the signal EVT to change the operating mode of the pest AI model 132 from a low-power (or sleep) state to an active (or high power) state. Next, in the step 512, the pest AI model 132 may compare the sensor data (e.g., from the signal IN) to data about pests in the pest database 144. In the step 514, the pest AI model 132 may classify the intruder(s) 60*a*-60*c* as a pest. For example, the pest AI model 132 may use the data in the pest database 144 to identify a particular type pest. Next, the method 500 may move to the step 516.

In the step 516, the pest AI model 132 may select and perform a countermeasure. For example, the memory 114 may provide the signal ACT to the pest AI model 132 to provide access to the action list 140. The pest AI model 132 may determine an appropriate countermeasure for the particular pest based on the scenario detected in the event based on the sensor data. The processor 112 may generate the signal COM/DT to enable the deterrence device 104. Next, in the step 518, the pest AI model 132 may monitor the sensor data of the environment 50 continually generated during the detected event. The pest AI model 132 may monitor the sensor data to determine the outcome of the countermeasure selection (e.g., determine whether the detected pest was successfully deterred). In the step 520, the pest AI model 132 may generate a natural text description event record of the pest classification, the countermeasure selection and the outcome. The natural text description may be provided as an event record in the signal INT for storage in the pest records 142. Next, the method 500 may return to the step 504. For example, the apparatus 100 may continuously monitor the environment 50 (e.g., a geo-fenced area) for pests, deploy non-lethal countermeasures for the pests and generate event records describing the attempt to deter the pests.

Figure 9:
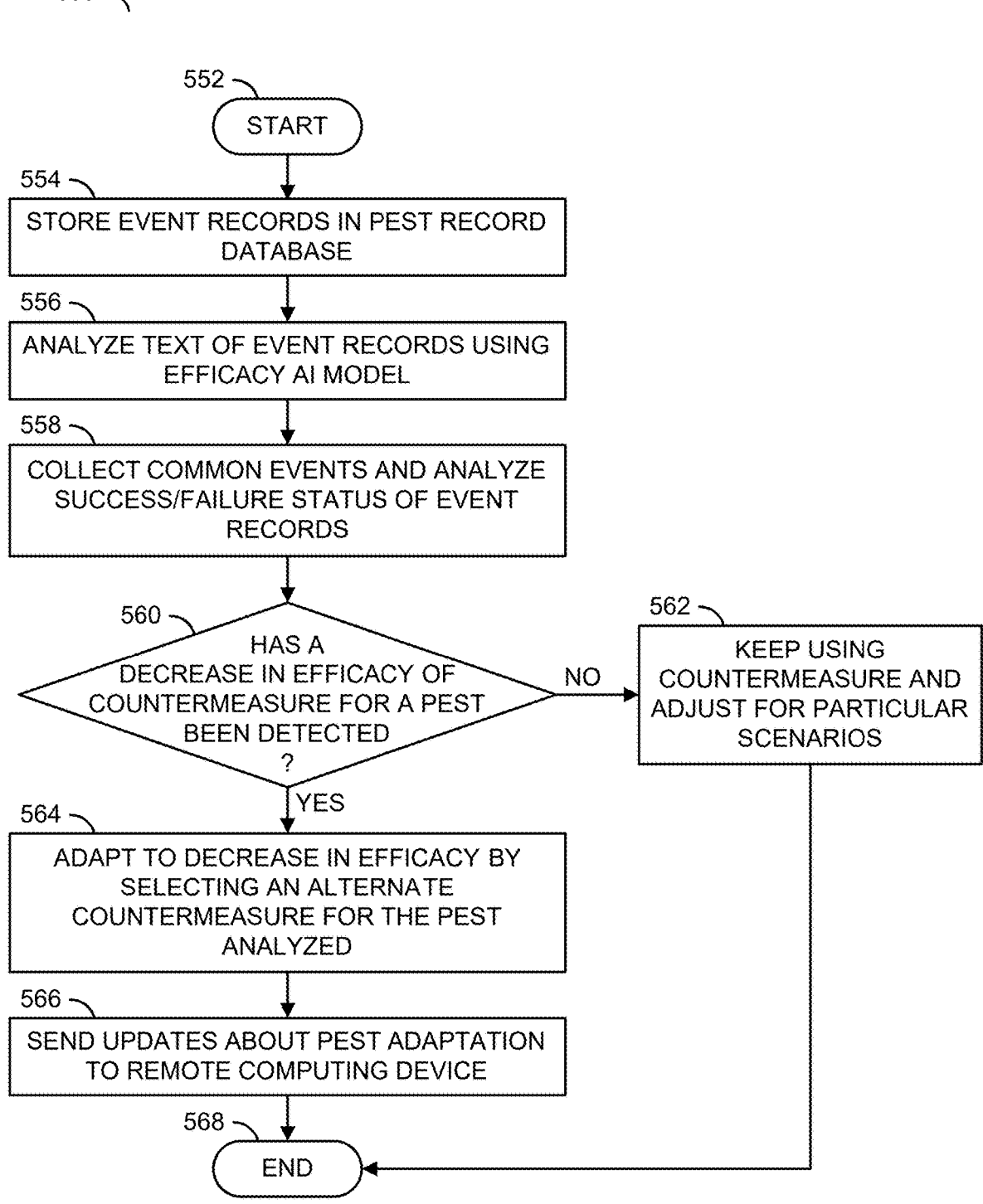
FIG. 9 is a flow diagram illustrating a method for adapting countermeasures in response to decreasing efficacy against a pest.

Referring to FIG. 9, a method (or process) 550 is shown. The method 550 may adapt countermeasures in response to decreasing efficacy against a pest. The method 550 generally comprises a step (or state) 552, a step (or state) 554, a step (or state) 556, a step (or state) 558, a decision step (or state) 560, a step (or state) 562, a step (or state) 564, a step (or state) 566, and a step (or state) 568.

The step 552 may start the method 550. In the step 554, the processor 112 may store the event record(s) in the pest database 144 of the memory 114. For example, each event record 454 generated by the pest AI model 132 may be stored in the pest records 142. Next, in the step 556, the efficacy AI model 144 may analyze the text of the event records stored in the pest records 142. For example, the memory 114 may provide the signal RCD to the efficacy AI model 134 comprising the event records. In the step 558, the efficacy AI model 134 may collect common events and analyze a success/failure status of the event records. For example, the efficacy AI model 134 may parse the natural language of the event records to determine whether particular pests were successfully deterred and/or determine how effective particular countermeasures have been. Next, the method 550 may move to the decision step 560.

In the decision step 560, the efficacy AI model 134 may determine whether there has been a decrease in efficacy of a particular countermeasure for a pest. In one example, the decrease in efficacy may comprise detecting one or more failures to deter a pest. In another example, the decrease in efficacy may be a success rate of a countermeasure dropping below a threshold value. In yet another example, the decrease in efficacy may be determined according to a threshold amount of time to deter a pest. In still another example, the decrease in efficacy may be determined based on feedback from a user. If there has been no decrease in efficacy, then the method 550 may move to the step 562. In the step 562, the efficacy AI model 134 may not recommend changes and the pest AI model 132 may keep using the countermeasure for the particular pest. In some embodiments, the efficacy AI model 134 may suggest adjustments for particular scenarios (e.g., not playing loud audio when people are detected). Next, the method 550 may move to the step 568.

In the decision step 560, if a decrease in efficacy has been detected, then the method 550 may move to the step 564. In the step 564, the efficacy AI model 134 may generate the signal LRN comprising adjustments for the pest AI model 132 to adapt to the decrease in efficacy by selecting an alternate countermeasure for the pest analyzed. The adjustments may comprise updated weights and/or biases used by the AI model implemented by the pest AI model 132. For example, the pest AI model 132 may select a different countermeasure from the action list 140 in response to receiving the signal LRN. Next, in the step 566, the communication device 116 may send updates about the pest adaptations to countermeasures to the remote computing device 452. For example, the processor 112 may generate the signal UPD_L comprising information about the countermeasures that have been used and how the pests have responded to the countermeasures over time. Next, the method 550 may move to the step 568. The step 568 may end the method 550.

Figure 10:
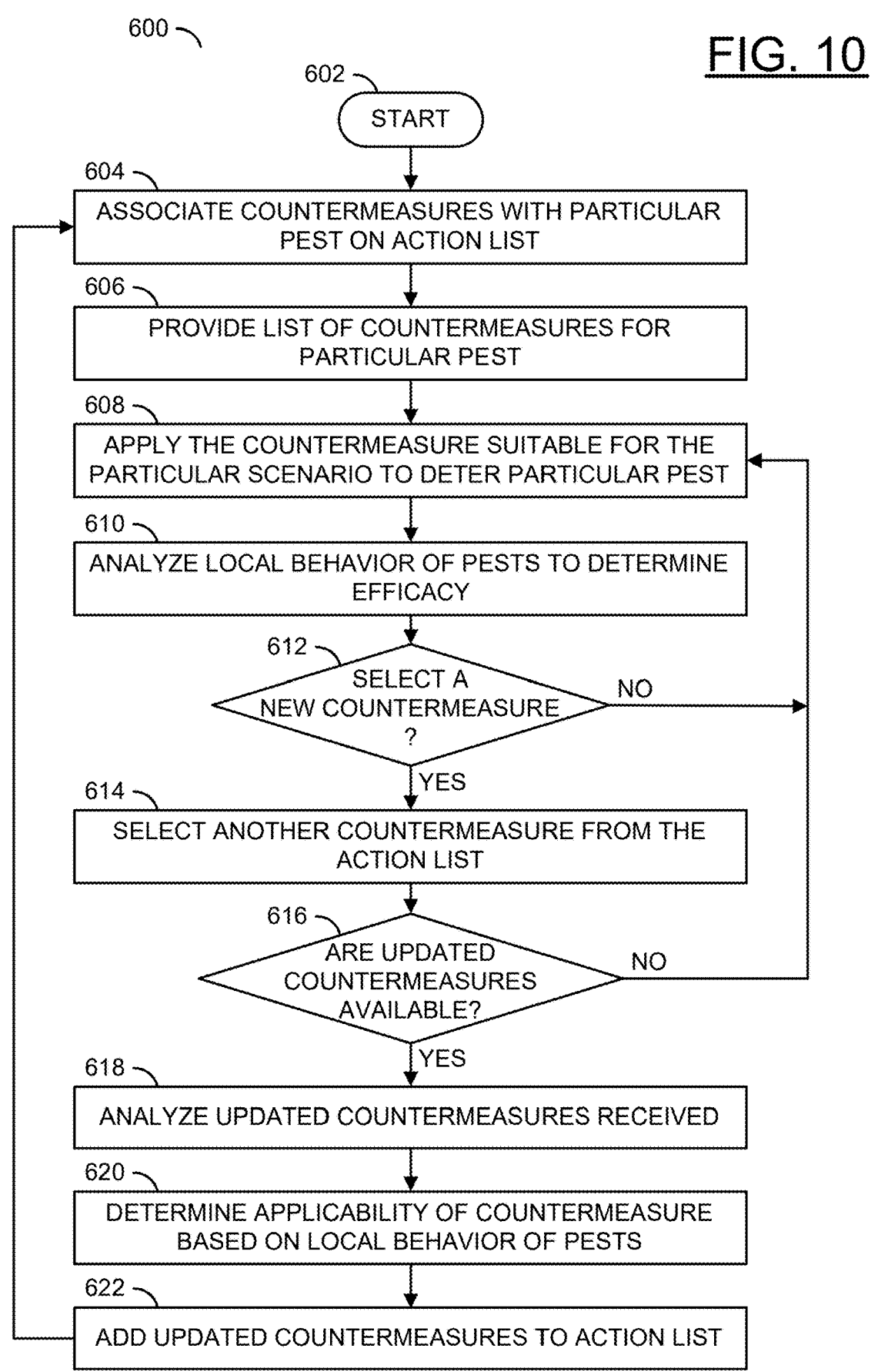
FIG. 10 is a flow diagram illustrating a method for updating an action list.

Referring to FIG. 10, a method (or process) 600 is shown. The method 600 may update an action list. The method 600 generally comprises a step (or state) 602, a step (or state) 604, a step (or state) 606, a step (or state) 608, a step (or state) 610, a decision step (or state) 612, a step (or state) 614, a decision step (or state) 616, a step (or state) 618, a step (or state) 620, and a step (or state) 622.

The step 602 may start the method 600. In the step 604, the action list 140 may associate countermeasures with particular pests. For example, the action list 140 may comprise particular countermeasures to apply to particular pests (e.g., a countermeasure to deter a goose may be different from a countermeasure to deter a rat). In some embodiments, the action list 140 may comprise ranked listings of the countermeasures. For example, each pest may have an associated set of countermeasures to select from that target a specific type of perception by the pest (e.g., geese—#1—high pitch audio at a particular frequency (Hz), #2—aggressive posturing by a ground bot, etc., bugs—#1—activate fan, #2—activate bug zapper, etc.). Next, in the step 606, the memory 114 may provide the list of countermeasures for the particular pest. For example, the memory 114 may provide the signal ACT comprising the list of available countermeasures of the pest classified by the pest AI model 132. Next, in the step 608, the processor 112 may apply the countermeasure suitable for the particular scenario to deter the pest. For example, the pest AI model 132 may select the countermeasure from the available countermeasures and the processor 112 may generate the signal COM/DT. In the step 610, the efficacy AI model 134 may analyze the event records to analyze the local behavior of the pests to determine the efficacy of particular countermeasures. For example, the pests 60a-60c in each local environment 50 may adapt to and/or become desensitized to countermeasures differently. For example, crows are known to adapt quickly to particular sounds and/or learn to not fear a scarecrow. Next, the method 600 may move to the decision step 612.

In the decision step 612, the efficacy AI model 134 may determine whether the pest AI model 132 should start to select a new countermeasure. For example, if the apparatus 100 is not effectively deterring the pests, the efficacy AI model 134 may generate recommendations to modify the behavior of the pest AI model 132 to select another deterrence approach from the action list 140. If no new countermeasure is to be selected, then the method 600 may return to the step 608. If a new countermeasure is selected, then the method 600 may move to the step 614. In the step 614, the pest AI model 132 may select another countermeasure from the action list 140. Next, the method 600 may move to the decision step 616.

In the decision step 616, the pest AI model 132 and/or the efficacy AI model 134 may determine whether updated countermeasures are available. For example, the apparatus 100 may communicate with the remote computing device 452 to receive the signal ACT_UPD. The signal ACT_UPD may comprise information about new effective ways to deter particular pests based on data from other deterrence devices (e.g., other implementations of the apparatus 100 in other locations). If there are no updated countermeasures available, then the method 600 may return to the step 608. If there are updated countermeasures available, then the method 600 may move to the step 618.

In the step 618, the pest AI model 132 may analyze the updated countermeasures received. Next, in the step 620, the pest AI model 132 may determine an applicability of the countermeasures based on a local behavior of pests. For example, the pest AI model 132 may determine which countermeasures may be performed (e.g., based on the deterrence devices 104a-104b implemented), which countermeasures apply to which pests, which countermeasures may be suitable for the environment 50, etc. In the step 622, the processor 112 may add the updated countermeasures to the action list 140. Next, the method 600 may return to the step 604.

Figure 11:
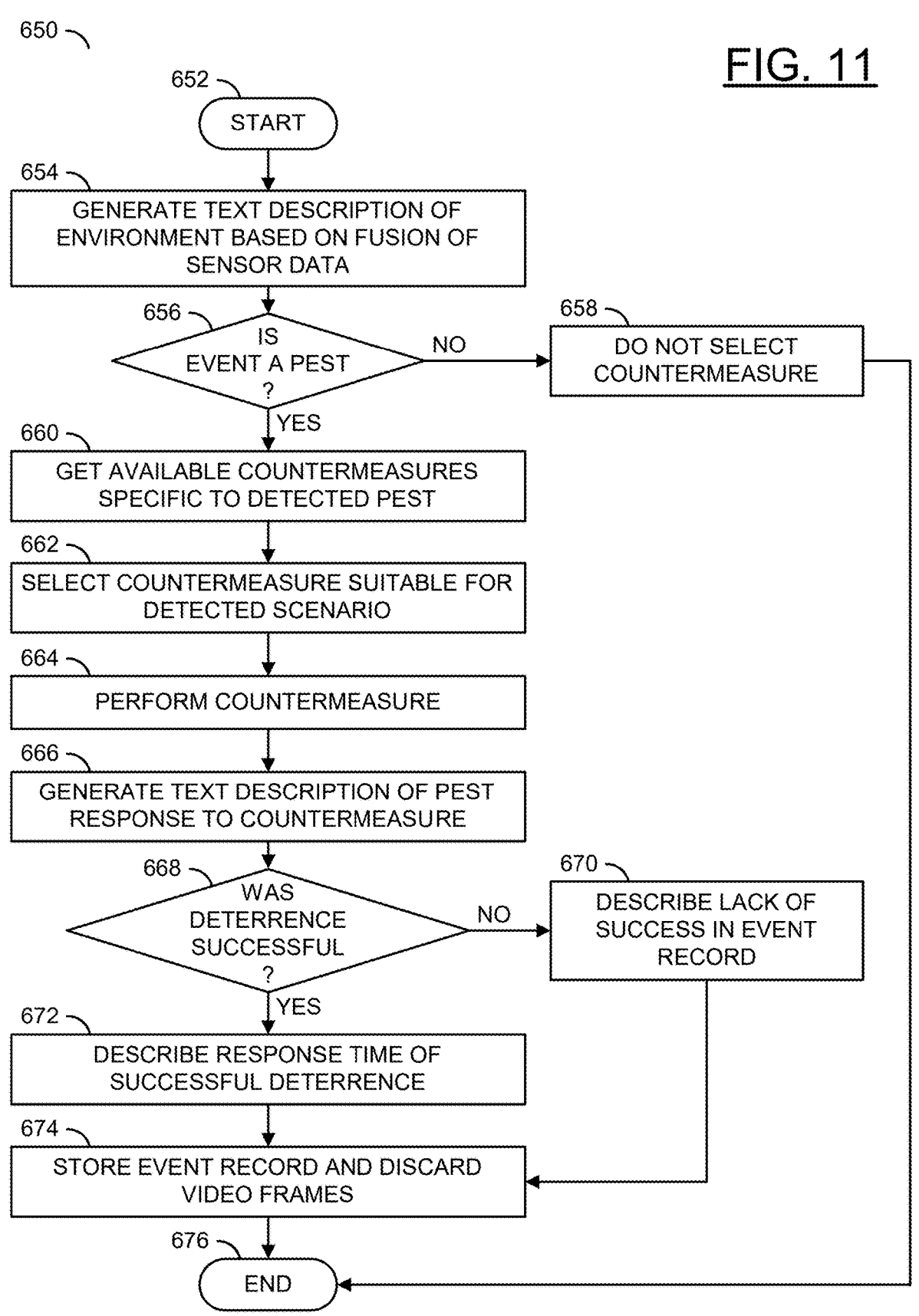
FIG. 11 is a flow diagram illustrating a method for generating an event record.

Referring to FIG. 11, a method (or process) 650 is shown. The method 650 may generate an event record. The method 650 generally comprises a step (or state) 652, a step (or state) 654, a decision step (or state) 656, a step (or state) 658, a step (or state) 660, a step (or state) 662, a step (or state) 664, a step (or state) 666, a decision step (or state) 668, a step (or state) 670, a step (or state) 672, a step (or state) 674, and a step (or state) 676.

The step 652 may start the method 650. In the step 654, the pest AI model 132 may generate a natural text description of the environment 50 based on a fusion of the sensor data. For example, the pest AI model 132 may analyze the data generated by the sensors 102a-102n that correspond to the time frame of the signal EVT to provide a text-based description of what the sensors 102a-102n have detected and, based on the combination of sensor data, determine what is happening in the environment 50. The text description may be the start of the event record 454 (e.g., provide at least the sensor IDs 470a, the pest type 470b and a portion of the description 470c). Next, the method 650 may move to the decision step 656.

In the decision step 656, the pest AI model 132 may determine whether the event corresponds to a pest. For example, another (non-pest) intruder may have caused the activation of the pest AI model 132 by the intruder module 130 (e.g., a friendly person, a desired animal or pet, a false positive detection, etc.). The text description generated by the pest AI model 132 may provide a classification of the intruder/event. If the event detected does not describe a pest, then the method 650 may move to the step 658. In the step 658, the pest AI model 132 may not select a countermeasure. For example, no deterrence device 104 may be activated when no pest is detected. Next, the method 650 may move to the step 676. In the decision step 656, if the event is determined to be a pest (e.g., classified as one of the pests in the pest record 142), then the method 650 may move to the step 660.

In the step 660, the pest AI model 132 may get the available countermeasures from the action list 140. Next, in the step 662, the pest AI model 132 may select the countermeasure suitable for the detected scenario. For example, the pest AI model 132 may analyze the text of the event record to determine the scenario and/or which countermeasure may be appropriate for the scenario (e.g., the event record 454 may comprise a description of whether there are people detected, whether it is night/day, describe the time of year, etc., which all may be factors in determining which countermeasure to select). In the step 664, the apparatus 100 may perform the countermeasure selected. Next, in the step 666, the pest AI model 132 may generate the text description of the pest response to the countermeasure. For example, the pest AI model 132 may update the event record 454 with natural text details of the rationale for selecting the particular countermeasure, when the countermeasure was deployed, how the pest reacted to the countermeasure, whether deterrence was successful, etc. (e.g., provide the response 470_d_ in the event record 454). Next, the method 650 may move to the decision step 668.

In the decision step 668, the pest AI model 132 may determine whether the deterrence was successful. The success/failure status may be determined based on whether the pest has left the geo-fenced area 50 and/or whether the pest has stopped performing an undesired behavior (e.g., stopped a dog from barking without necessarily chasing the dog out of the environment 50). If the deterrence was unsuccessful, the method 650 may move to the step 670. In the step 670, the pest AI model 132 may update the event record 454 with a description of the lack of success for the status 470_e_. Next, the method 650 may move to the step 674. In the decision step 668, if the deterrence was successful, then the method 650 may move to the step 672. In the step 672, the pest AI model 132 may describe the response time of the successful deterrence. For example, the event record 454 may be updated with a natural text description for the status 470_e_ describing the successful deterrence and/or how long before the pest left the geo-fenced area 50 (or stopped performing the undesirable behavior). Next, the method 650 may move to the step 674.

In the step 674, the event record 454 may be stored in the pest records 142. In some embodiments, video frames of the event (e.g., generated by the capture device sensor 102_n_) may be discarded along with other sensor data (e.g., to reduce an amount of data stored, to preserve privacy, etc.). Next, the method 650 may move to the step 676. The step 676 may end the method 650.

The functions performed by the diagrams of FIGS. 1-11 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. Execution of instructions contained in the computer product by the machine, may be executed on data stored on a storage medium and/or user input and/or in combination with a value generated using a random number generator implemented by the computer product. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n"

may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. An apparatus comprising:

an interface configured to receive sensor data from a plurality of sensors; and a processor configured to (i) detect an intruder in response to (a) an analysis of said sensor data and (b) an initial intruder threshold that does not classify said intruder, (ii) change a local artificial intelligence (AI) model from a low power mode of operation to an active mode of operation in response to detecting said intruder and (iii) generate a countermeasure signal in response to a countermeasure selection by said local AI model when said local AI model is in said active mode of operation, wherein said local AI model operating in said active mode of operation is configured to (A) analyze said sensor data, (B) compare said sensor data of said intruder to a database of pests to perform a classification of said intruder as a selected pest, (C) determine said countermeasure selection in response to (i) said selected pest and (ii) a context of an environment, (D) monitor said sensor data for an outcome of said countermeasure selection, (E) generate a text description comprising said classification of said selected pest, said countermeasure selection, a basis for said countermeasure selection and said outcome of said countermeasure selection, and (F) update weights and biases of said local AI model for (a) said classification of said intruder and (b) said countermeasure selection, in response to an analysis of said text description.

2. The apparatus according to claim 1, wherein said countermeasure selection is a non-lethal countermeasure for deterring said selected pest.

3. The apparatus according to claim 1, wherein said local AI model does not select said countermeasure selection if said intruder is not classified as a pest in said database of pests.

4. The apparatus according to claim 1, wherein said countermeasure signal is presented to a countermeasure device configured to deploy said countermeasure selection.

5. The apparatus according to claim 4, wherein (i) said countermeasure device is located in a geo-fenced area and (ii) a success condition for said outcome of said countermeasure selection comprises said selected pest leaving said geo-fenced area.

6. The apparatus according to claim 4, wherein said countermeasure device is configured to generate one or more of a non-audible audio frequency and a light effect.

7. The apparatus according to claim 4, wherein said countermeasure device is at least one of (i) an automated drone and (ii) an automated ground bot.

8. The apparatus according to claim 1, wherein said text description is presented to an event database comprising a plurality of pest events.

9. The apparatus according to claim 8, wherein a Large Language Model Artificial Intelligence (LLM AI) model is configured to analyze said plurality of pest events in said event database.

10. The apparatus according to claim 9, wherein said LLM AI model is configured to (i) detect a decrease in efficacy of said countermeasure selection in response to said selected pest in response to said analysis of said plurality of pest events and (ii) update said weights and biases in response to said analysis of said plurality of pest events.

11. The apparatus according to claim 10, wherein said local AI model is configured to adapt to said decrease in efficacy by modifying said countermeasure selection.

12. The apparatus according to claim 8, wherein at least one of said database of pests and said event database is implemented by a remote scalable computing service.

13. The apparatus according to claim 9, wherein (i) said LLM AI model is configured to provide a conversational dialog with an end user and (ii) said text description comprises text readable by said end user and said LLM AI model.

14. The apparatus according to claim 13, wherein (i) said conversational dialog comprises a query from said end user and (ii) said LLM AI model (a) parses a natural text of said query, (b) searches said event database based on said query, and (c) generates a natural text response for said end user based on said query, a context from previous input from said end user in said conversational dialog and a result of searching said event database.

15. The apparatus according to claim 1, wherein said context of said environment for said countermeasure selection is determined according to a time of day.

16. The apparatus according to claim 1, wherein said context of said environment for said countermeasure selection is determined according to a detection of a presence of a person.

17. The apparatus according to claim 1, wherein said countermeasure selection is determined according to said selected pest detected and a prior efficacy of said countermeasure selection for said selected pest.

18. The apparatus according to claim 1, wherein said sensors comprise one or more of a camera device, a radar device, a lidar device, and a thermal camera device.

19. The apparatus according to claim 1, wherein said countermeasure selection is selected for deterring a particular behavior of said selected pest without removing said selected pest from said environment.

20. The apparatus according to claim 1, wherein (i) said local AI model is configured to implement a video-to-text transformer network and (ii) said text description is generated by said video-to-text transformer network.

* * * * *